(12) United States Patent
Ge

(10) Patent No.: US 8,577,990 B2
(45) Date of Patent: Nov. 5, 2013

(54) METHOD OF SENDING LOCATION SERVICE REQUEST IN MOBILE COMMUNICATION NETWORK

(75) Inventor: Zhengkai Ge, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 1460 days.

(21) Appl. No.: 11/874,192

(22) Filed: Oct. 17, 2007

(65) Prior Publication Data

US 2009/0049154 A1 Feb. 19, 2009

Related U.S. Application Data

(63) Continuation of application No. PCT/CN2007/070514, filed on Aug. 17, 2007.

(51) Int. Cl.
*G06F 15/16* (2006.01)
*H04W 24/00* (2009.01)

(52) U.S. Cl.
USPC .................... 709/217; 455/456.1; 455/456.2

(58) Field of Classification Search
USPC ........................................................ 709/217
See application file for complete search history.

(56) References Cited

U.S. PATENT DOCUMENTS

| | | | |
|---|---|---|---|
| 6,792,466 B1 * | 9/2004 | Saulpaugh et al. | 709/229 |
| 6,970,869 B1 * | 11/2005 | Slaughter et al. | 1/1 |
| 7,412,518 B1 * | 8/2008 | Duigou et al. | 709/227 |
| 2004/0253964 A1 * | 12/2004 | Zhu | 455/456.3 |
| 2006/0099961 A1 | 5/2006 | Duan | |
| 2006/0120320 A1 * | 6/2006 | Shim | 370/328 |
| 2006/0135174 A1 | 6/2006 | Kraufvelin et al. | |
| 2006/0223490 A1 * | 10/2006 | Kim et al. | 455/403 |
| 2006/0258369 A1 * | 11/2006 | Burroughs et al. | 455/456.1 |

FOREIGN PATENT DOCUMENTS

| | | |
|---|---|---|
| CN | 1582007 A | 2/2005 |
| CN | 1606367 A | 4/2005 |
| CN | 1794861 A | 6/2006 |
| EP | 1672935 A1 | 6/2006 |
| EP | 1768424 A1 | 3/2007 |

OTHER PUBLICATIONS

International Search Report and Written Opinion of PCT Application No. PCT/CN2007/070514, date of mailing May 29, 2008, 7 pages total.

(Continued)

*Primary Examiner* — Brian P Whipple
*Assistant Examiner* — James Edwards
(74) *Attorney, Agent, or Firm* — Conley Rose, P.C.; Grant Rodolph

(57) ABSTRACT

A method for a network system to send location service request to a network user is provided. The method includes receiving a network client initiated location request including information associated with a first event and information associated with a second event. The method further includes processing the location request. Additionally, if the second event is determined to have occurred by the network system, the network system sends an event message to the network user including information associated with the first event. Moreover, the method includes returning a second receipt acknowledgment of the event message to the network client. In an alternative embodiment, a method for a network system to send a cancellation of a previous deferred location request to a network user is provided.

32 Claims, 13 Drawing Sheets

(56) References Cited

OTHER PUBLICATIONS

Chinese Application No. 200780000907.6, Office Action dated Mar. 30, 2010, English Translation and Chinese Translation, 20 pages, Mar. 30, 2010.

"Digital Cellular Telecommunications System (Phase 2+); Universal Mobile Telecommunications System (UMTS); Functional Stage 2 Description of Location Services (LCS) (3GPP TS 23.271 version 7.8.0 Release 7)," ETSI TS 123 271 V7.8.0, Mar. 2003, 147 pages.

Foreign Communication From A Counterpart Application, European Application No. 07800990.9, Extended European Search Report dated Aug. 23, 2010, 8 pages.

Foreign Communication From A Counterpart Application, European Application No. 07800990.9, European Office Action dated Mar. 2, 2012, 5 pages.

Foreign Communication From A Counterpart Application, European Application No. 07800990.9, European Office Action dated Jul. 4, 2013, 5 pages.

* cited by examiner

METHOD OF SENDING LOCATION SERVICE REQUEST IN MOBILE COMMUNICATION NETWORK

CROSS-REFERENCES TO RELATED APPLICATIONS

This application is a continuation of the PCT Application No. PCT/CN2007/070514, filed Aug. 17, 2007, which is incorporated by reference herein for all purposes.

FIELD OF THE TECHNOLOGY

Embodiments of the present invention are directed to a communication technology for communication networks. More particularly, the invention provides a method of sending Location Service (LCS) Request in mobile communication networks. Merely by way of example, the invention has been applied to send the deferred location request of change of area event via a network with LCS system. But it would be recognized that the invention has a much broader range of applicability.

BACKGROUND OF THE INVENTION

For Location Service of mobile communication networks, location information of target User Equipment (UE) is obtained by location techniques, where UE demotes a user terminal to be located in mobile communication network, and location information may be either geographical latitude and longitude information or location of local streets. Location estimate of target UE obtained by LCS system may be provided to target UE for self positioning of the target UE, or provided for communication system itself, for zonal charging or operation maintenance. Location information thereof may also be provided to other client application ends requesting for location of target UE, such as organizations and individuals, for supplement service. Therefore, location service is of wide application in terms of emergency assistance, vehicle guidance, intelligent traffic system, work dispatching, team management, mobile yellow page inquiry and network performance enhancement, etc.

FIG. 1 is a simplified diagram illustrating conventional logic structure of Location Service (LCS) in mobile communication networks. As shown in FIG. 1, a network client 101 may issue a LCS request to a network system 102 for obtaining a location estimate of a network user 103. The network client may be a LCS Client comprising a software and/or hardware entity that interacts with network for the purpose of obtaining location information for one or more target network users. The network system may be a network with LCS system comprising a software and/or hardware entity offering LCS capabilities (including accepting requests, servicing requests, and sending back responses to the received requests). The network user can be a Mobile Station (MS) or Mobile Equipment (ME) or simply the target User Equipment (UE) in the mobile networks. The network client can be either external or internal to the network system or can be an alternative network user or even the network user itself. The LCS request may also issued by the network system based on system internal conditions or capabilities.

In the LCS system, function logic entities for implementing location service include Gateway Mobile Location Center (GMLC), user data storage server (HLR/HSS), Central Network (CN) and Radio Access Network (RAN). GMLC may further include Requesting GMLC (R-GMLC), Home GMLC (H-GMLC) and Visited GMLC (V-GMLC). R-GMLC is a GMLC for receiving the location information request initiated by LCS Client to target UE, H-GMLC is a GMLC which the target UE belongs to, V-GMLC is the GMLC in the network with LCS system that target UE visits, namely the GMLC that target UE is located. R-GMLC, H-GMLC and V-GMLC may be the same physical entity, or be different physical entities. CN, acting as an interface between the network and network subscriber and a traffic distributor, includes functional entities such as one or more Mobile Switching Centers (MSC) or General Packet Radio System (GPRS) nodes, e.g., Serving GPRS Support Nodes (SGSN). Through capabilities of the MSC/SGSN and/or UE itself, the target UE may be detected by the LCS system for its network connection status, idle or active, location in terms of MSC/SGSN area, authentication or subscriber profiling, privacy verification, etc.

For deferred location request, the location service response may not be immediately provided to the location service requester or LCS Client. The positioning mechanism and the location report may not be triggered until the occurrence of an indicated event (e.g., certain time or event specified by the LCS Client). However, if the target UE to be positioned is in an abnormal state, for example no signal, or being switched off etc., the MSC/SGSN may not be able to successfully send the event to the UE. Therefore the event driven deferred location request procedure usually be terminated abnormally without providing an appropriate cause for the LCS Client. Similarly, in case when a LCS Client issues a request to cancel a previously issued deferred location request, the MSC/SGSN may not be able to successfully send the event cancellation request to the UE if it is in an abnormal state. Therefore, the UE will be unable to actually cancel the deferred location request triggered by the original event. Without knowing the status of the UE, additional cancellation requests later issued by the LCS Client issues may also fail. Either case reduces the rate of success to send the event driven deferred location request or event cancellation request to the UE and eventually leads to low efficiency and poor quality for the network to provide location services to its subscribers. diminishing the utilization, reliability, and value of the current available networking technology.

From the above, it is seen that an improved technique for sending the deferred location service request or cancellation request in mobile communication network is desired.

SUMMARY OF THE INVENTION

Embodiments of the present invention are directed to a communication technology for communication networks. More particularly, the invention provides a method of sending Location Service (LCS) Request in mobile communication networks. Merely by way of example, the invention has been applied to send the deferred location request of change of area event via a network with LCS system. But it would be recognized that the invention has a much broader range of applicability.

In accordance with one aspect of the disclosure, a method is useful for sending an event triggered deferred location request or cancellation of deferred location request by adding a special event in associate with the triggering event. Such a special event can be processed via a special procedure within LCS system: when sending an event information to target UE via LCS system, if target UE is in an abnormal state, LCS system may utilize network capability to check the ability of target UE to return to the normal state (e.g. indication of the occurrence of UE Available event or other abilities), and may only send the event information after the UE returns to the normal state, so that the event information can be successfully sent to target UE (for triggering the deferred location request). The method can be also applied for sending a cancellation of deferred location request: when sending the cancel event information to target UE, the LCS system can utilize network capability (e.g. UE Available event) to ensure that the cancel event information be sent to target UE only after target UE is in normal state.

In a specific embodiment, the invention provides a method for a network system to send location request to a network user. The method includes receiving a location request from a network client, the location request including information associated with a first event and information associated with a second event. The method further includes processing the location request. Additionally, the method includes determining whether the second event occurs. If the second event is determined to have occurred, the network system sends an event message, which includes information associated with the first event, to the network user. Moreover, the method includes returning a second receipt acknowledgment of the event message to the network client.

In an alternative specific embodiment, the invention provides a method for a network system to send a location service (LCS) cancellation request to a network user. The method includes receiving an LCS cancellation request from a network client for canceling a location request. The location request includes information associated with a first event. The LCS cancellation request includes information associated with a second event. The method further includes processing the LCS cancellation request. Additionally, the method includes determining whether the second event occurs. If the second event is determined to have occurred, the network system sends a cancellation message to instruct the network user to cancel the location request. Moreover the method includes sending a cancellation service response to the network client.

In an alternative embodiment, a network system for providing location service about a network user for a network client includes a location service (LCS) system. The LCS system is configured to receive a location request from a network client. The location request includes information associated with a first event and information associated with a second event. The LCS system further is configured to process the location request and determine whether the second event occurs. If the second event is determined to have occurred, the LCS system sends an event message to the network user including information associated with the first event. The LCS system further returns a receipt acknowledgment of the event message to the network client. The receipt acknowledgment of the event message comprises at least information that the network user has successfully received the location request including conditions for the network user to provide location information at the occurrence of the first event.

In another alternative embodiment, the invention provides a network system that is configured to receive an LCS cancellation request from a network client for canceling a location request. The location request includes information associated with a first event and the LCS cancellation request includes information associated with a second event. The second event is associated with a network user. The network system is further configured to process the LCS cancellation request and return a receipt acknowledgment of the LCS cancellation request to a network client. The network system determines whether the second event occurs. If the second event is determined to have occurred, the network system sends a cancellation message to instruct the network user to cancel the location request. Additionally, the network system is configured to send a cancellation service response to the network client.

In yet another specific embodiment, the invention provides a method for a network system to send location request to a network user. The method includes receiving a location request by a first network subsystem from a network client. The location request includes information associated with a first event and information associated with a second event. The method further includes transferring information associated with the second event to a second network subsystem and returning a first receipt acknowledgment of the location request to the network client. Additionally, the method includes determining by the second network subsystem whether the second event occurs. If the second event is determined to have occurred, the method includes receiving the location request including information associated with the first event from the first network subsystem. The method further includes sending an event message by the second network subsystem to the network user. The event message includes information associated with the first event. Moreover, the method includes returning a second receipt acknowledgment to the first network subsystem. Furthermore, the method includes sending the second receipt acknowledgment by the first network subsystem to the network client.

In yet still another specific embodiment, the invention provides a method for a network system to send a location service (LCS) cancellation request to a network user. The method includes receiving an LCS cancellation request from a network client by a first network subsystem for canceling a location request. The location request includes information associated with a first event. The LCS cancellation request includes information associated with a second event which is associated with a network user. The method further includes transferring information associated with the second event to a second network subsystem and returning a receipt acknowledgment to a network client. Additionally, the method includes determining by the second network subsystem whether the second event occurs. If the second event is determined to have occurred, the method includes receiving the LCS cancellation request from the first network subsystem. The method further includes sending a cancellation message to instruct the network user to cancel the location request and returning a cancellation service response to the first network subsystem. Moreover, the method includes sending the cancellation service response to the network client.

In yet another alternative embodiment, a network system for providing location service about a network user for a network client includes at least a first network subsystem and a second network subsystem. The second network subsystem is in communication with the first network subsystem. Additionally, the first network subsystem is configured to receive a location request from a network client including information associated with a first event and information associated with a second event. The first network subsystem further transfers information associated with the second event to the second network subsystem and return a first receipt acknowledgment of the location request to the network client. Moreover, the second network subsystem is configured to determine whether the second event occurs. If the second event is determined to have occurred, the second network subsystem receives the location request including information associated with the first event from the first network subsystem. Furthermore, the second network subsystem is configured to send an event message to the network user including information associated with the first event and return a second receipt acknowledgment of the location request to the first network subsystem. The first network subsystem is further configured to send the second receipt acknowledgment of the location request to the network client. The second receipt acknowledgment includes at least information that the network user has successfully received the location request including conditions for the network user to provide location information at the occurrence of the first event.

In yet still another alternative embodiment, the invention provides a network system for providing location service about a network user for a network client. The network system includes a first network subsystem and a second network subsystem in communication with the first network system. The first network subsystem is configured to receive a location service (LCS) cancellation request from a network client for canceling a location request. The location request includes information associated with a first event and the LCS cancellation request includes information associated with a second event which is associated with a network user. The first network subsystem is further configured to transfer information associated with the second event to a second network subsystem and return a receipt acknowledgment to the network client. Additionally, the second network subsystem is configured to determine whether the second event occurs. If the second event is determined to have occurred, the second network subsystem receives the LCS cancellation request from the first network subsystem and sends a cancellation message to instruct the network user to cancel the location request. The second network subsystem is further configured to return a cancellation service response to the first network subsystem. Moreover, the first network subsystem is further configured to send the cancellation service response to the network client. In one embodiment, the receipt acknowledgment includes at least an indication that the LCS cancellation request including information associated with a second event is received by the second network subsystem and the cancellation service response includes at least a message that the location request is successfully canceled by the network user.

Benefits are achieved by way of the present invention over conventional techniques. For example, the present technique provides a special event attached with the procedures of deferred location request and cancellation of deferred location request that relies upon conventional technology. Such a special event can be processed by the network system so that a regular event message for triggering the deferred location request can be sent to the target UE only when the target UE is detected by the network system (e.g., via UE Available event or other network capabilities) to be in or returned to normal state (i.e., capable of being attached by one of the network node). Therefore, the deferred location request including the triggering event can be successfully sent to the target UE. Same for canceling the location request, the LCS cancellation request can also be sent only when the target UE is ensured by the network (e.g., using UE Available event) to be in or returned to the normal state. Thus, the cancellation of a previously requested deferred location request can be successfully cancelled by the target UE. In some embodiments, the method provides increased successful rate for network system to send the event message to the target UE or cancel the event message. Additionally, the method provides a process that has increased successful rate of the location services (LCS) under the network system over conventional equipment and processes. Depending upon the embodiment, one or more of these benefits may be achieved. These and other benefits will be described in more throughout the present specification and more particularly below.

Various additional objects, features and advantages of the present invention can be more fully appreciated with reference to the detailed description and accompanying drawings that follow.

DETAILED DESCRIPTION OF THE INVENTION

Embodiments of the present invention are directed to a communication technology for communication networks. More particularly, the invention provides a method of sending Location Service (LCS) Request in Global System for Mobile communication (GSM) or Wideband Code Division Multiple Access (W-CDMA) networks. Merely by way of example, the invention has been applied to send the deferred location request of change of area event via a network including LCS system. But it would be recognized that the invention has a much broader range of applicability.

The 3rd Generation Partnership Project (3GPP), as an organization to define standardized specifications for GSM network and W-CDMA network, has produced a variety of technical specifications about the location services. These specifications defined the capabilities for network to position the terminals, including immediate positioning and deferred positioning. For example, the deferred positioning includes periodic positioning.

Figure 1:
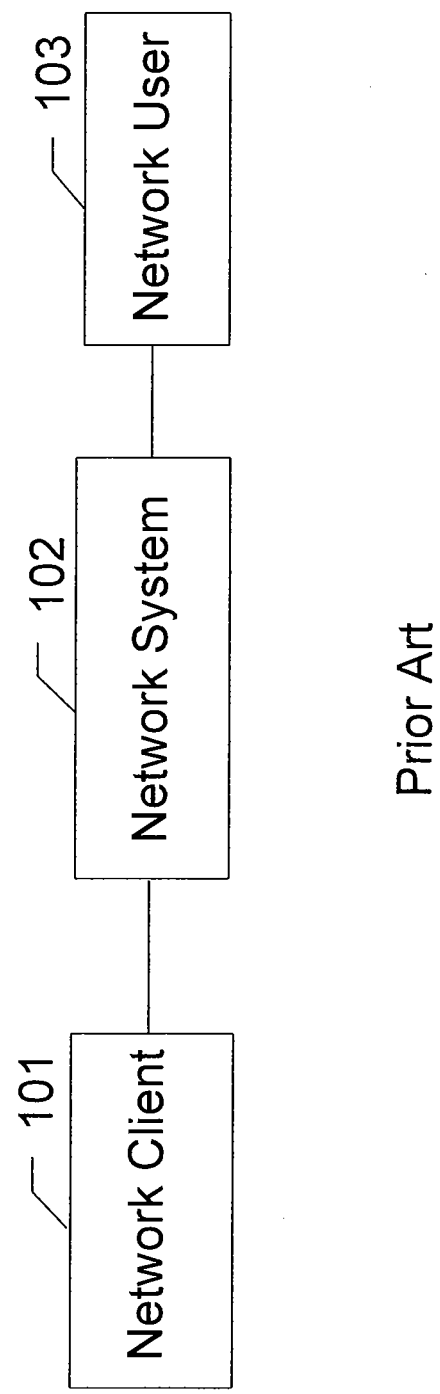
FIG. 1 is a simplified diagram illustrating a conventional logic structure for implementing location service.
Figure 2:
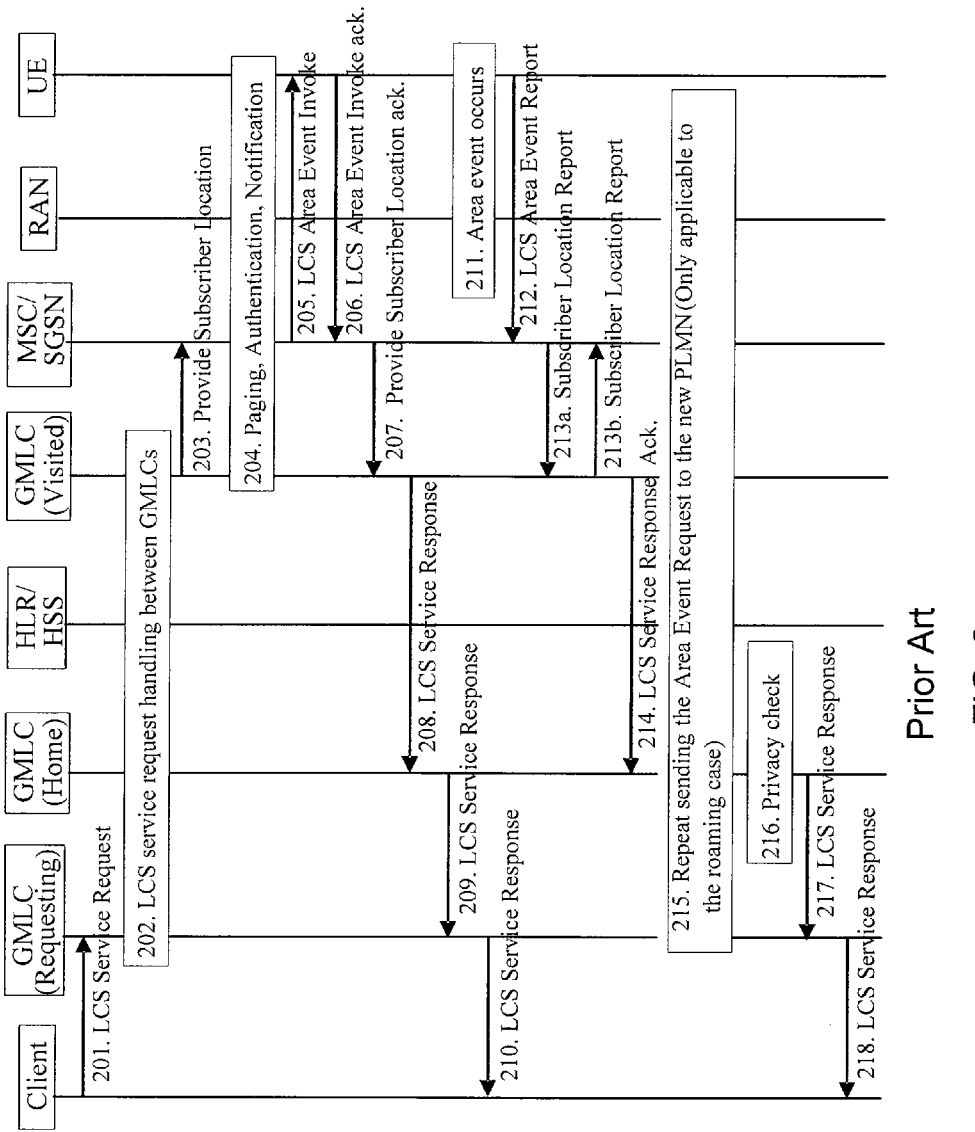
FIG. 2 is a message interaction depiction illustrating progress of location request of change of area event in conventional technology.

For example, FIG. 2 illustrates a conventional procedure for a Deferred Location Request where a location report is returned to the network by the UE following a change of area event. An change of area event occurs when the UE leaves, enters or is within a target area as defined by geographical area, public land mobile network (PLMN) identity, country code or geopolitical name of the area.

Firstly, a LCS Client issued a LCS Service Request at the process 201. The LCS Service Request contains the change of area type deferred location request information, i.e. details of the target area and the nature of the event, whether the event to be reported is the UE being inside, entering into or leaving the target area. The LCS Service Request may specify the validity time, i.e. start time and stop time, for sending the deferred location request to LCS system to a GMLC node (first through a Requesting GMLC (R-GMLC)), or for canceling the deferred location request by a R-GMLC. Additionally, if the time expired for the target UE without triggering the area event, UE shall delete this deferred location request. The LCS Service Request may also contain an indication of the minimum interval time between area event reports, if applicable. The LCS Service Request may further contain the information whether the deferred area event may be reported one time only, or several times. If the change of area event is reported one time only, the LCS Service Request may be completed after the first area event has occurred. If the target area is expressed by local coordinate system or geopolitical name, the R-GMLC may convert the target area to geopolitical area expressed by a shape defined in 3GPP Technical Specification TS23.032. In addition to the target area definition, the LCS Client may include the country code of the target area in the area event request.

In process 202, if indication of the requested location estimate is included in the area event request, the R-GMLC should record this indication and any relevant parameters such as Quality of Service (QoS). The information received by the R-GMLC is transferred to the H-GMLC. The H-GMLC assigns a Location Deferred Request (LDR) reference number to this LCS Service Request then transfers the information to the V-GMLC, including the LDR reference number and the H-GMLC address.

At the process 203, if the received target area is expressed by a shape defined in 3GPP Technical Specification TS23.032, the V-GMLC converts the target area into an Area Definition consisting of the corresponding list of cell identities, location areas or routing area. If the V-GMLC is not able to translate the target area into network identities, it shall reject the request and send an LCS Service Response to H-GMLC with the appropriate error cause.

Further in process 203, if the received target area is expressed by country code or PLMN identity, the V-GMLC shall use the country code or PLMN identity as the Area Definition.

The V-GMLC sends the Area Definition to a MSC/SGSN in a Provide Subscriber Location (PSL) request and includes the LDR reference number and the H-GMLC address in the request.

The PSL request may define whether the event to be reported is the UE being inside, entering into or leaving the area. The PSL request may also include the minimum interval time between area event reports, the information whether the deferred area event may be reported one time only or several times, if applicable.

In process 204, the MSC/SGSN verifies the UE capabilities with regard to the change of area event. If either the MSC/SGSN or the UE does not support the deferred location request for the change of area event (for temporary or permanent reasons), a PSL return error message may be sent with a suitable cause in process 207. If the UE is in idle mode, the central network (CN) performs paging, authentication and ciphering. If privacy notification/verification is requested, the MSC/SGSN sends an LCS Location Notification Invoke message to the target UE indicating the change of area type deferred location request and whether privacy verification is required. If privacy verification was requested, the UE returns an LCS Location Notification Return Result to the MSC/SGSN indicating whether permission is granted or denied.

Next in process 205, the MSC/SGSN sends the LCS Area Event Invoke message to the UE carrying the Area Definition, other area event information, the LDR reference number and the H-GMLC address. The message may also define whether the event to be reported is the UE being inside, entering into, leaving the area. The message may also include the minimum interval time between area event reports and the information whether the deferred area event may be reported one time only, or several times, if applicable.

In process 206, if the LCS Area Event Invoke message is successfully received by the UE and the UE supports the change of area type deferred location request, the UE sends a LCS Area Event Invoke acknowledgement to MSC/SGSN and begins monitoring for the change of area event. The UE may determine whether it is inside, entering into or leaving the target area by comparing the current serving cell identity, location area, routing area, PLMN identity or country code to the Area Definition received from the MSC/SGSN. In case of soft handover, it is sufficient if one of the cells belongs to the target area. In case the Area Definition consists of a location or routing area, PLMN or country identity the UE shall check for the area event during the normal location or routing area update process. The change of area event detection mechanism must not influence on the normal UE cell selection and reselection procedures. If the UE does not support the deferred location request (for temporary or permanent reasons), it may send the LCS Area Event Invoke acknowledgement with the appropriate error cause.

Next in process 207, if either the MSC/SGSN or the UE does not support the deferred location request for the change of area event (for temporary or permanent reasons), a PSL return error message may be sent to the V-GMLC with a suitable cause. If both of the MSC/SGSN and UE support the deferred location request for the change of area event, a PSL Ack. message may be returned by the MSC/SGSN to the V-GMLC without a location estimate. The MSC/SGSN may include the result of the notification/verification in the PSL Ack. message to the V-GMLC, if the notification/verification is needed. The PSL Ack. message may include the LDR reference number and the H-GMLC address. The change of area event invoke result may be also included, if necessary. After sending the PSL Ack. message to the V-GMLC, the deferred location request may be completed in the MSC/SGSN.

Next from process 208 to process 210, the V-GMLC returns a first LCS Service Response message via the H-GMLC and the R-GMLC to the LCS Client to notify whether the request was successfully accepted or not. After sending the first LCS Service Response message to the H-GMLC, the deferred location request may be completed in the V-GMLC.

Then in process 211, the UE detects that the requested area event has occurred.

Next in process 212, before sending a LCS Area Event Report, the UE may establish either a Circuit Switching (CS) radio connection or Packet Switching (PS) signaling connection. The UE sends the LCS Area Event Report to the linked MSC/SGSN including the original LDR reference number and the H-GMLC address. The report may also include the result of the notification/verification procedure, if the notification/verification is needed.

When the MSC/SGSN receives the report and it can handle this report, an acknowledgement as a response may be sent to the UE. If the UE does not receive any response from the MSC/SGSN after sending the report, i.e. the current MSC/SGSN does not support the deferred location request for the area event (for temporary or permanent reasons), the UE may re-send the report more times. If the UE always does not receive the response, the UE may stop sending the report, then record a corresponding flag to indicate that a report has been sent unsuccessfully. When the UE performs location update and detects the Location Area Identity (LAI) or Routing Area (RA) is changed, if the flag has been set, the UE may send the report to the corresponding MSC/SGSN, and the flag may be cleared upon a success of the sending.

If the UE was requested to report the change of area event one time only, the deferred location request may be completed. In case multiple reports were requested, the UE must not send a repeated LCS Area Event Report more often than the requested minimum interval indicated in the LCS Area Event Invoke message.

Next in process 213a, the MSC/SGSN sends the Subscriber Location Report (SLR) message to its associated V-GMLC with an indication of the event occurrence, the LDR reference number, the H-GMLC address and may also include the indication whether the obtained location estimate satisfies the requested accuracy or not (provided that this indication is obtained from RNC with the location estimate). The V-GMLC sends an SLR acknowledgement to MSC/SGSN in process 213b and the MSC/SGSN may record charging information.

Next in process 214, the V-GMLC sends a second LCS Service Response message to the H-GMLC with an indication of the event occurrence, the LDR reference number and the H-GMLC address. The second LCS Service Response message is generated based on received SLR message from the MSC/SGSN and is sent in accordance with the requested QoS Class. The LDR reference number and the H-GMLC address may be used to identify the source of the original deferred location request in the case that the UE has relocated before the area event occurred.

In process 215, in case the UE moves to another PLMN of the PLMN identities list, according to the PLMN identity the UE may determine whether the Area Definition of the target area is available. If it is not available, the UE may report that it has roamed into a new PLMN, including the new PLMN identity and the LDR reference number. The H-GMLC may transfer the original area event request to the V-GMLC of the new PLMN. The procedure may be continued as described in process 202 and onwards where the Area Definition of the new PLMN shall be downloaded to the UE. Otherwise, the UE monitors the area event in the new PLMN, does not inform the H-GMLC that it has entered into a new PLMN.

Next in process 216, the H-GMLC performs the privacy check.

Next in process 217, the H-GMLC sends the second LCS Service Response message to R-GMLC with the LDR reference number. Unless multiple reports were requested, the deferred location request shall be completed in the H-GMLC after sending the second LCS Service Response message to the R-GMLC.

Finally in process 218, the R-GMLC sends the second LCS Service Response message to the LCS client. The LDR reference number that was sent to the LCS Client in process 210 may be included in the response. If the location estimate of the target UE is requested in the request and the location estimate was successfully obtained, the R-GMLC may put the obtained location estimate into the second LCS Service Response message. If the location estimate of the target UE is requested in the request but the location estimate could not be obtained, the R-GMLC may send the second LCS Service Response message without the location estimate. Unless multiple reports were requested, the deferred location request shall be completed in the R-GMLC after sending the second LCS Service Response message to the LCS Client.

Figure 3:
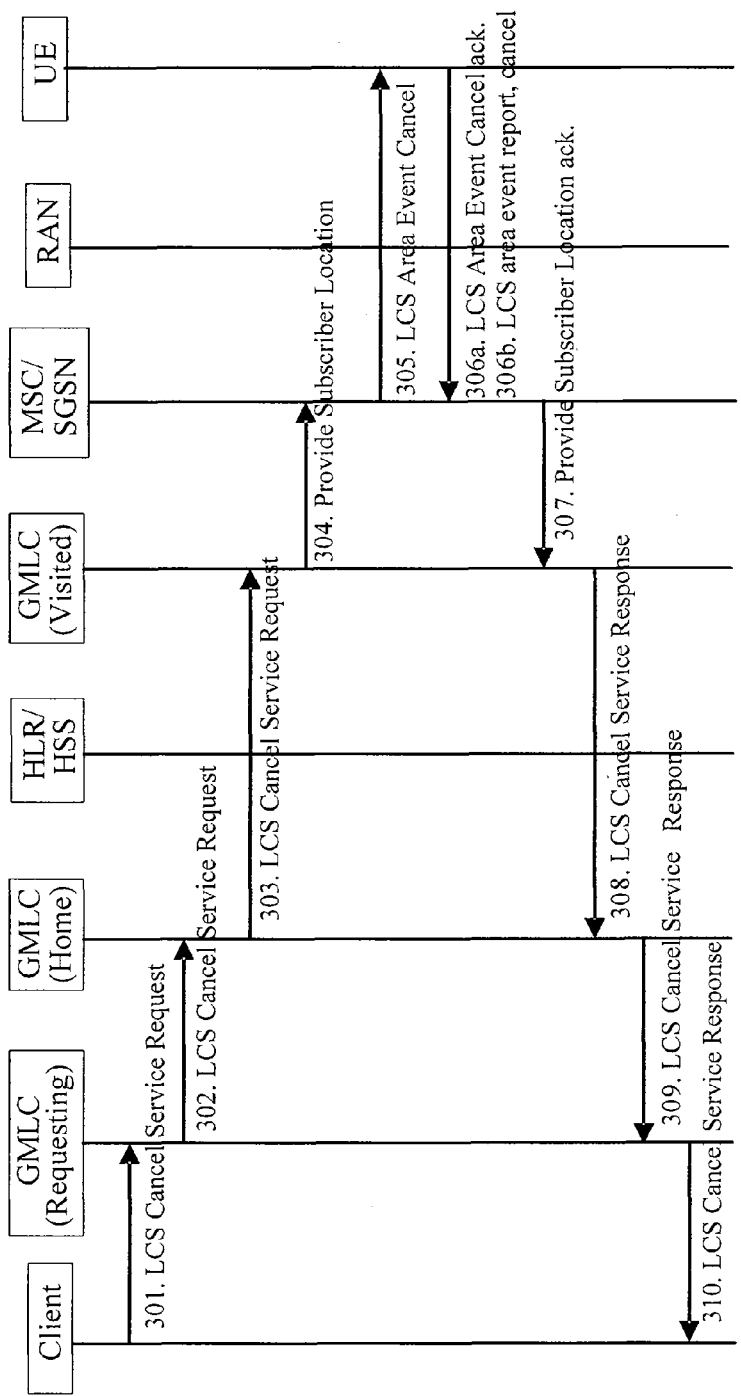
FIG. 3 is a message interaction depiction illustrating progress of cancellation of a deferred location request of change of area event in conventional technology.

For cancellation of a deferred location request with change of area event, 3GPP also defined a similar technical specification. FIG. 3 illustrates a conventional procedure for canceling a previously requested deferred location request for the change of area event.

In process 301, the LCS Client sends a LCS cancellation request to R-GMLC to cancel a previously requested deferred location request triggered by change of area event. Because of the deferred location request is previously requested, during the original deferred location request procedure the LCS Client has received an indication of the original request with the LDR reference number. Now the LCS Client may still include the same LDR reference number in the LCS cancellation request.

In process 302, the R-GMLC sends the LCS cancellation request to H-GMLC, including the LDR reference number.

In process 303, the H-GMLC transfers the LCS cancellation request to V-GMLC, including the LDR reference number and the H-GMLC address.

Next in process 304, the V-GMLC sends a PSL request message to MSC/SGSN, indicating a cancellation of a deferred location request with the LDR reference number. The PSL request message includes a H-GMLC address.

Next in process 305, the MSC/SGSN sends the LCS Area Event Cancel, including the LDR reference number and the H-GMLC address, request to UE.

Next in process 306a, the UE cancels the area event deferred location request and sends the LCS Area Event cancellation ack. message, with no area event information included, to MSC/SGSN.

Then in process 306b, while the UE is monitoring for the area event to occur, the UE may cancel or terminate the deferred location request for the change of area event on its own behalf by sending the LCS Area Event Report with the LDR reference number, an indication of the cancellation and an appropriate error cause.

Next in process 307, the MSC/SGSN sends the cancellation acknowledgment to the V-GMLC in a PSL Ack. message with the LDR reference number and the H-GMLC address.

Next in process 308, the V-GMLC sends a LCS Cancel Service Response to the H-GMLC with the LDR reference number and the H-GMLC address.

Further in process 309, the H-GMLC sends the LCS Cancel Service Response to R-GMLC with the LDR reference number.

Finally in process 310, the R-GMLC sends the LCS Cancel Service Response to the LCS Client. The cancellation of a previously issued deferred location request indicated by the LDR reference number shall be completed in the R-GMLC and the LCS Client is notified.

As you can see, current method of sending the deferred location request or the cancellation of a previously requested deferred location request has problems to ensure the area event or event cancellation message being successfully sent to the UE by the MSC/SGSN if the UE is in abnormal state, such as no signal, or being switched off. Such problems result to an abnormal failure of providing or canceling the deferred location services, reducing the efficiency, reliability, and quality of service of the existing mobile network.

The embodiments of the present invention provide methods of sending a deferred location request or sending a cancellation request only when the UE is detected to be in normal state by the network system. The methods solve the problems mentioned above by adding a special event in the network message interaction procedures and utilizing the capability of the network to determine the UE returning to normal state (e.g., using UE Available event or other ability), improving the rate of success of event information sending and the corresponding LCS rate of success.

Figure 4A:
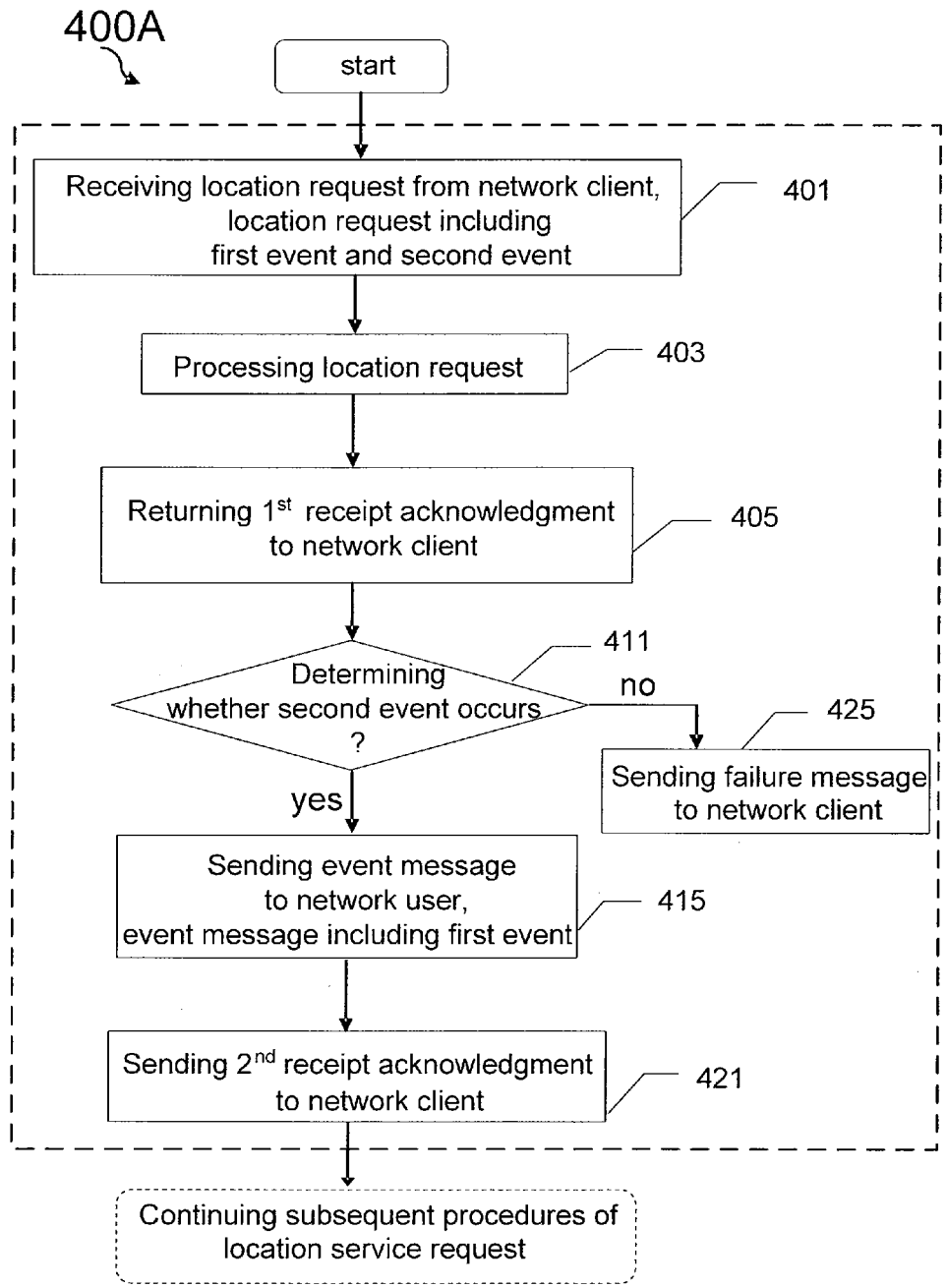
FIG. 4A is a flowchart illustrating a method for a network system to send a location service request to a network user according to an embodiment of present invention.

FIG. 4A is a flowchart diagram illustrating a method of sending a location service request according to an embodiment of present invention. This diagram is merely an example, which should not unduly limit the scope of the claimed herein. One of ordinary skill in the art would recognize many variations, alternatives, and modifications. For example, various steps may be added, removed, replaced, repeated, and/or partially overlapped. The method 400A for a network system to send a location request to a network user includes the following processes:

1. Process 401 for receiving location request including information associated with a first event and information associated with a second event from a network client;
2. Process 403 for processing the location request;
3. Process 405 for returning a first receipt acknowledgment of the location request to the network client;
4. Process 411 for determining by the network system whether the second event occurs; if no, goes to Process 425; if yes, goes to Process 415;
5. Process 415 for sending an event message including information associated with the first event to the network user;
6. Process 421 for transmitting a second receipt acknowledgment of the location request including the event message from the network user to the network client; and
7. Process 425 for sending a failure message of the location request to the network client.

The above sequence of processes provides a method according to an embodiment of the present invention. Other alternatives can also be provided where processes are added, one or more processes are removed, or one or more processes are provided in a different sequence without departing from the scope of the claims herein. The method 400A described in FIG. 4A can be further illustrated in more details below through the message interaction procedures shown in FIG. 5 according to certain embodiments of present invention.

The Method 400A starts with the Process 401, as shown in FIG. 4A: a network system receives a location request from a network client. The location request, in one embodiment, comprises information associated with a first event and information associated with a second event. In another embodiment, the location request may be initiated by the network system itself. Furthermore, more details of the process 401 can be illustrated by the process 501 in FIG. 5 according to certain embodiments of the present invention.

Figure 5:
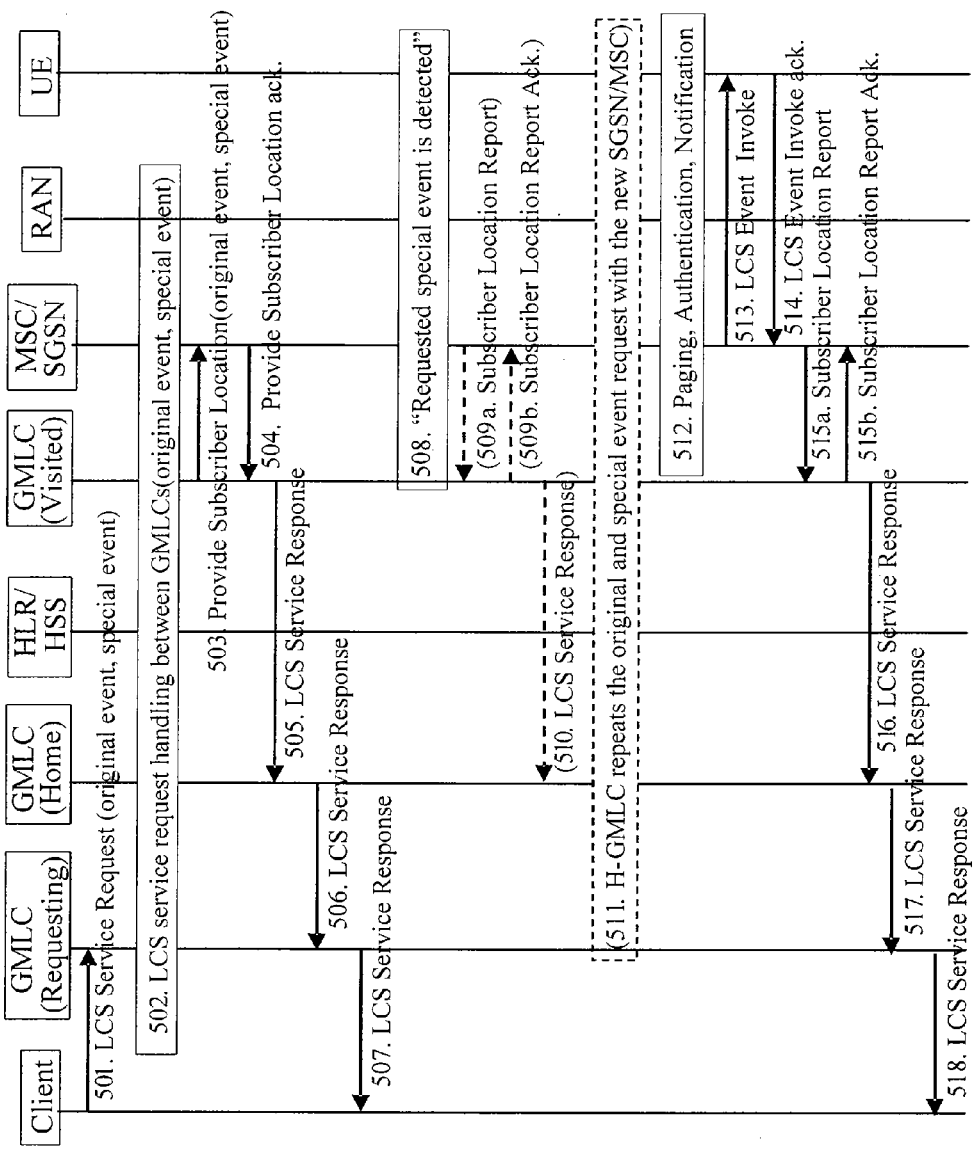
FIG. 5 is a message interaction depiction illustrating a method for a LCS system to send a deferred location request to a target user equipment (UE) according to an embodiment of present invention.

FIG. 5 is a message interaction depiction illustrating a method for a LCS system to send a deferred location request to a target user equipment (UE) according to an embodiment of present invention. This diagram is merely an example, which should not unduly limit the scope of the claimed herein. One of ordinary skill in the art would recognize many variations, alternatives, and modifications. For example, various processes may be added, removed, replaced, repeated, and/or partially overlapped.

As an example shown in FIG. 5, the network client may be a LCS Client. The LCS Client issues a deferred Location Service (LCS) Request to a network user which may be a target UE. The network system comprises a network with LCS system. At the process 501 of FIG. 5 according to an embodiment, the deferred LCS Service Request is sent by the LCS Client to a Requesting GMLC (R-GMLC) in the LCS system. In an alternative embodiment, the LCS Service Request may be initiated by the other components of the LCS system. As in existing technology the first event associated with the location request may be the original event associated with the deferred LCS Service Request in FIG. 5. As in existing technology, the occurrence of the first event shall be detected by the target UE so as to trigger the positioning of the UE and reporting to the LCS system. The second event associated with the location request according to a specific embodiment, may be an added special event associated with the deferred LCS Service Request in FIG. 5. The occurrence of the special event shall be monitored by the LCS system for ensuring the LCS Service Request of the original event to be successfully received by the target UE.

Referring to FIG. 4A, the process 403 of the method 400A is for the network system to process the received location request. This process can be illustrated in details in an example shown in the processes 502-503 of FIG. 5. At the process 502 in FIG. 5 according to an embodiment, the LCS Service Request including information associated with the original event and information associated with the special event is processed by the GMLCs in the LCS system. Firstly, the R-GMLC forwards the LCS Service Request to a Home GMLC (H-GMLC) which assigns a Location Deferred Request (LDR) reference number for this LCS Service Request. Then the H-GMLC sends the LCS Service Request with the assigned LDR reference number and a H-GMLC address to a Visited GMLC (V-GMLC) via a network storage server (HLS/HSS). In certain embodiments, R-GMLC, H-GMLC, and V-GMLC may perform all necessary processing steps to support the LCS Service Request with the original event. For example, the R-GMLC should record the indication of the requested location estimate driven by the original event and any relevant parameters such as Quality of Service (QoS).

At the process 503 in FIG. 5 according to an embodiment, the V-GMLC further sends the information in LCS Service Request including LDR reference number and the H-GMLC address to a MSC/SGSN of the LCS system in terms of a Provide Subscriber Location (PSL) request. In another embodiment, the PSL request received by the MSC/SGSN also includes necessary messages for monitoring and executing the original event. For example, the PSL request may define whether the event to be reported when it occurs. In another example, the PSL request may also include the minimum interval time between the event reports, the information whether the deferred event may be reported one time only or several times, if applicable.

Referring to FIG. 4A again, the method 400A moves to Process 405 after receiving the location request by the network system. Process 405 is for the network system to return a first receipt acknowledgment of the location request to the network client. Further details of the Process 405 may be illustrated by the processes 504-507 in FIG. 5 according to certain embodiments of the present invention.

At the process 504 in FIG. 5 according to an embodiment, after receiving the LCS Service Request including information of original event and special event, the MSC/SGSN may verify whether the LCS Service Request indicated by the special event is supported. In another embodiment, the MSC/SGSN also may check whether the target UE supports the LCS Service Request indicated by the original event. If no support in either case, the MSC/SGSN may send a PSL return error message with suitable causes to the V-GMLC. The V-GMLC may further return a first LCS Service Response message with error causes to the LCS Client via the H-GMLC and the R-GMLC.

In one embodiment, if the MSC/SGSN supports the LCS Service Request indicated by the special event and the MSC/SGSN and UE support the LCS Service Request indicated by the original event, the MSC/SGSN may directly return a PSL Acknowledgment (Ack.) message to the V-GMLC. The PSL Ack. message includes no information of the UE location or location estimate. Furthermore the PSL Ack. message includes the LDR reference number, the H-GMLC address, and an indication of the location request being received by the MSC/SGSN.

At the processes 505-507 in FIG. 5 according to an embodiment, the V-GMLC further returns a second LCS Service Response message to the LCS Client via the H-GMLC and the R-GMLC. In a specific embodiment, the second LCS Service Response message is the receipt acknowledgment described in Process 405 of FIG. 4A, which is returned by the network system to the network client. The second LCS Response message notifies the LCS Client the receipt of the LCS Service Request, including the LDR reference number, routing information, and event information by the MSC/SGSN in the LCS system.

Referring back to FIG. 4A, at Process 411 the network system determines whether the second event occurs, if yes, the method 400A goes to Process 415, if no under certain conditions defined by the network system, the method 400A goes to Process 425. Further details of the Process 411 may be illustrated by the processes 508-511 in FIG. 5 according to certain embodiments of the present invention.

Referring to FIG. 4A, in one embodiment, the second event as an added special event associated with the location request, may be or not related to the network user. For the special event not related to the network user, it may be pre-selected by the network client or defined independently by the network system. For the special event that is related to the network user, its occurrence may be directly related to the network user being detected, by the network system, to be in a normal state or to have returned to a normal state. In one embodiment, the detection by the network system can utilize the capabilities of the mobile network with LCS system or the target UE itself. In another embodiment, the network user being in the normal state or returned to the normal state comprises a target UE capable of establishing connection with one of the plurality of MSC/SGSNs in the LCS system through Subscriber Identity Module (SIM) or Universal Subscriber Identity Module (USIM) or other mechanisms.

In a specific embodiment, at the process 508 of FIG. 5, the target UE may be detected, by the MSC/SGSN that is handling the received LCS Service Request with the special event, to be in a normal state and not moved to another MSC/SGSN in the LCS system. Thus the special event may be determined to have occurred by the LCS system. Then the procedures of FIG. 5 may be continued as described in process 512 and onwards. In other words, a yes to the Process 411 leads to the Process 415 of the method 400A as shown in FIG. 4A.

In another specific embodiment, at the process 508 of FIG. 5, if the target UE may be detected, by the first MSC/SGSN that is handling the received LCS request with the special event, to be in normal state but changed to a second MSC/SGSN in the LCS system, the process 509 starts. Firstly, at the process 509a, the first MSC/SGSN returns a first Subscriber Location Report (SLR) message to the V-GMLC that is linked to the first MSC/SGSN. In one embodiment, the first SLR message includes the LDR reference number assigned for the LCS Service Request, the H-GMLC address, and necessary messages about the target UE moved to a second MSC/SGSN. Then at the process 509b, the V-GMLC further sends a first SLR Ack. message back to the first MSC/SGSN as a response.

In yet another embodiment, at the process 510 of FIG. 5, after the first SLR message is received, the V-GMLC sends a third LCS Service Response message to the H-GMLC, including the LDR reference number and necessary messages about the target UE moved to a second MSC/SGSN.

After the third LCS Service Response message including messages about the target UE moved to a second MSC/SGSN is received, in one embodiment at the process 511 of the FIG. 5, the H-GMLC may send the LCS Service Request to a new V-GMLC that links to the second MSC/SGSN. The new V-GMLC may transfer the LCS request including information associated with the original event and information associated with the special event to the second MSC/SGSN. In one embodiment, the procedures will restart from the process 502 and onwards.

Referring back to FIG. 4A, the Process 415 of the method 400A is performed, after the second event has been detected to occur, to send an event message including information of the first event to the network user. Subsequently, the Process 421 of the method 400A further includes transmitting a receipt acknowledgment of the event message to the network client. Further details of the Processes 415 and 421 may be illustrated by the processes 512-518 in FIG. 5 according to certain embodiments of the present invention.

At the process 512 of FIG. 5 according to an embodiment, the MSC/SGSN is about to send the LCS Service Request to the currently attached target UE. If the MSC/SGSN discovers that the target UE is in idle mode, the central network (CN) where the MSC/SGSN belongs, may perform paging, authentication and ciphering. In one embodiment, if privacy notification/verification is requested, the MSC/SGSN may send an LCS Location Notification Invoke message to the target UE indicating that this is the original event driven deferred location request and whether privacy verification is required. If privacy verification was requested, the target UE may send an LCS Location Notification Return Result to the MSC/SGSN, indicating whether permission is granted or denied.

At the process 513 of FIG. 5 according to an embodiment, the MSC/SGSN may send a LCS Event Invoke message to the attached target UE. In a specific embodiment, the LCS Event Invoke message is the event message described in the Process 415, which includes the information of the first event and is sent by the network system to the network user. In another embodiment, the LCS Event Invoke message may include the necessary message for monitoring and executing the original event, the LDR reference number assigned to the LCS Service Request, and the H-GMLC address.

At the process 514 of FIG. 5 according to an embodiment, if the target UE successfully received the LCS Event Invoke message and support the deferred LCS Service Request triggered by the original event, the target UE may return a LCS Event Ack. message with a success response to the MSC/SGSN and may begin to monitor the original event under the guidance of the LCS Event Invoke message. In another embodiment, if the target UE does not support the deferred LCS Service Request triggered by the original event, the target UE may send a LCS Event Ack. message with relevant error causes to the MSC/SGSN.

At the process 515 of FIG. 5 according to an embodiment, the MSC/SGSN may transmit a second SLR message to the V-GMLC after receiving the LCS Event Ack. message. In one embodiment, the second SLR message includes an indication whether the original event driven LCS Service Request is successfully sent to the UE or not, the LDR reference number, and the H-GMLC address. The V-GMLC further sends a second SLR Ack. message back to the MSC/SGSN as a response.

At the processes 516-518 of FIG. 5 according to an embodiment, the V-GMLC may transmit a third LCS Service Response message to the LCS Client via H-GMLC and R-GMLC. In a specific embodiment, the third LCS Service Response message is the second receipt acknowledgment of the event message described in Process 421 of FIG. 4A, which is returned by the network system to notify the network client whether the LCS Service Request has been successfully sent to the network user or not.

Up to this process, sending the event driven deferred LCS Service Request to the target UE is completed. Now the network system may wait for the UE to detect the occurrence of the original event to trigger the report of the UE location or location related information. In one embodiment, if the original event is a change of area event, the LCS system may perform the process 211 of FIG. 2 and onwards to complete the Location Services procedures as in existing technology.

Alternatively, at Process 411 of the method 400A, if the network system determines that the second event (or the special event) does not occur under certain conditions preset by the network client or the network system, the network system may perform the Process 425 to send a failure message back to the network client. In one embodiment, the preset conditions for determining the occurrence of the second event may comprise a maximum time period. The time period may start from a first time of information associated with the second event being received by the network system and ending at a second time defined by the network client or predetermined by the network system. In one embodiment, the failure message may be returned to the network client in terms of a LCS Service Response message as shown in FIG. 5.

Figure 4B:
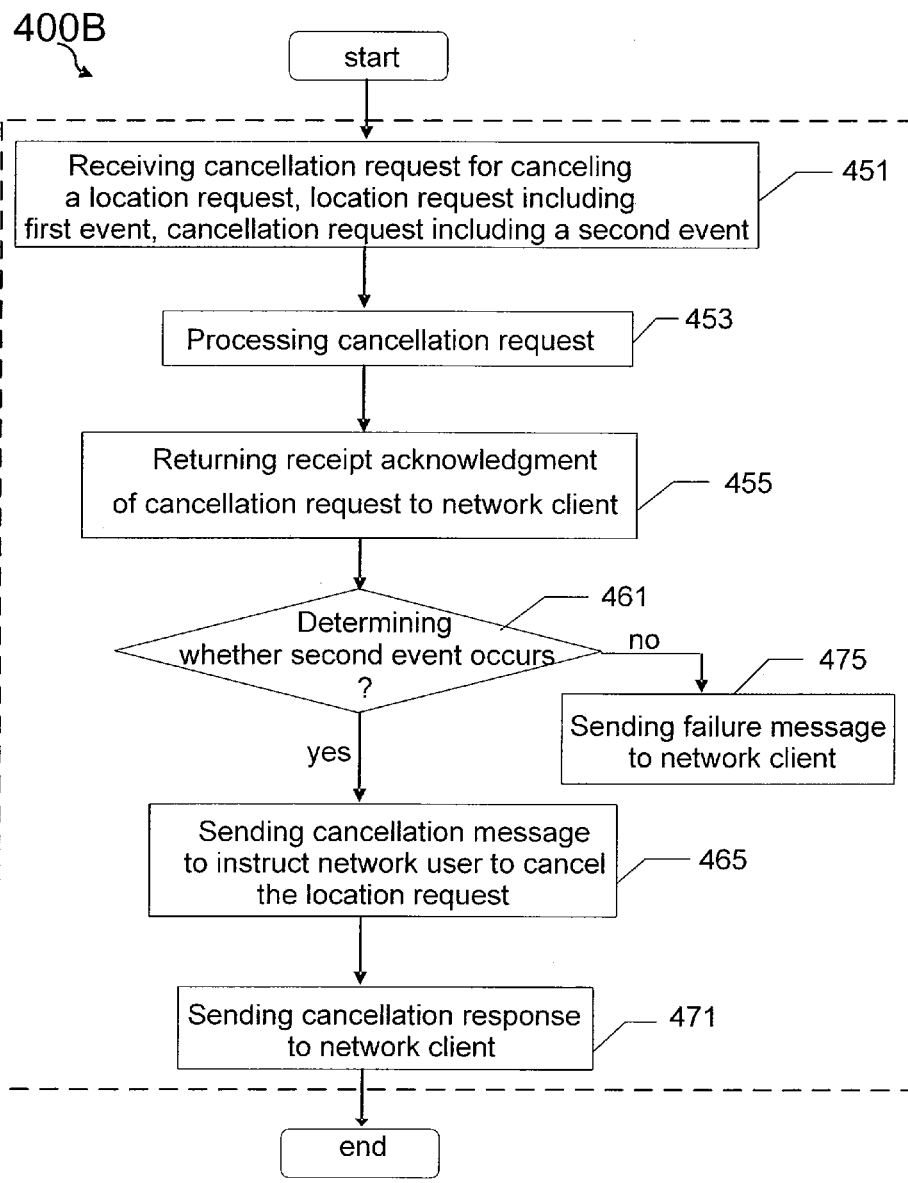
FIG. 4B is flowchart illustrating a method for a network system to send a cancellation request of a location request to a network user according to an embodiment of present invention.

Similarly, the embodiments of the present invention may be illustrated in procedures of sending a cancellation request of a previously requested deferred location request. FIG. 4B is a flowchart diagram illustrating a method of sending a cancellation request for canceling a location service request according to an embodiment of present invention. This diagram is merely an example, which should not unduly limit the scope of the claimed herein. One of ordinary skill in the art would recognize many variations, alternatives, and modifications. For example, various steps may be added, removed, replaced, repeated, and/or partially overlapped. The method 400B for a network system to send a cancellation request to a network user includes the following processes:

1. Process 451 for receiving cancellation request for canceling a location request, the location request including information associated with a first event and the cancellation request including information associated with a second event;

2. Process 453 for processing the cancellation request;

3. Process 455 for returning a receipt acknowledgment to the network client;

4. Process 461 for determining by the network system whether the second event occurs; if no, goes to Process 475; if yes, goes to Process 465;

5. Process 465 for sending a cancellation message to instruct the network user to cancel the location request;

6. Process 471 for transmitting a cancellation service response to the network client; and 7. Process 475 for sending a failure message of the cancellation request to the network client.

The above sequence of processes provides a method according to an embodiment of the present invention. Other alternatives can also be provided where processes are added, one or more processes are removed, or one or more processes are provided in a different sequence without departing from the scope of the claims herein. The method 400B described in FIG. 4B can be further illustrated in more details below through the message interaction procedures shown in FIG. 6 according to certain embodiments of present invention.

Figure 6:
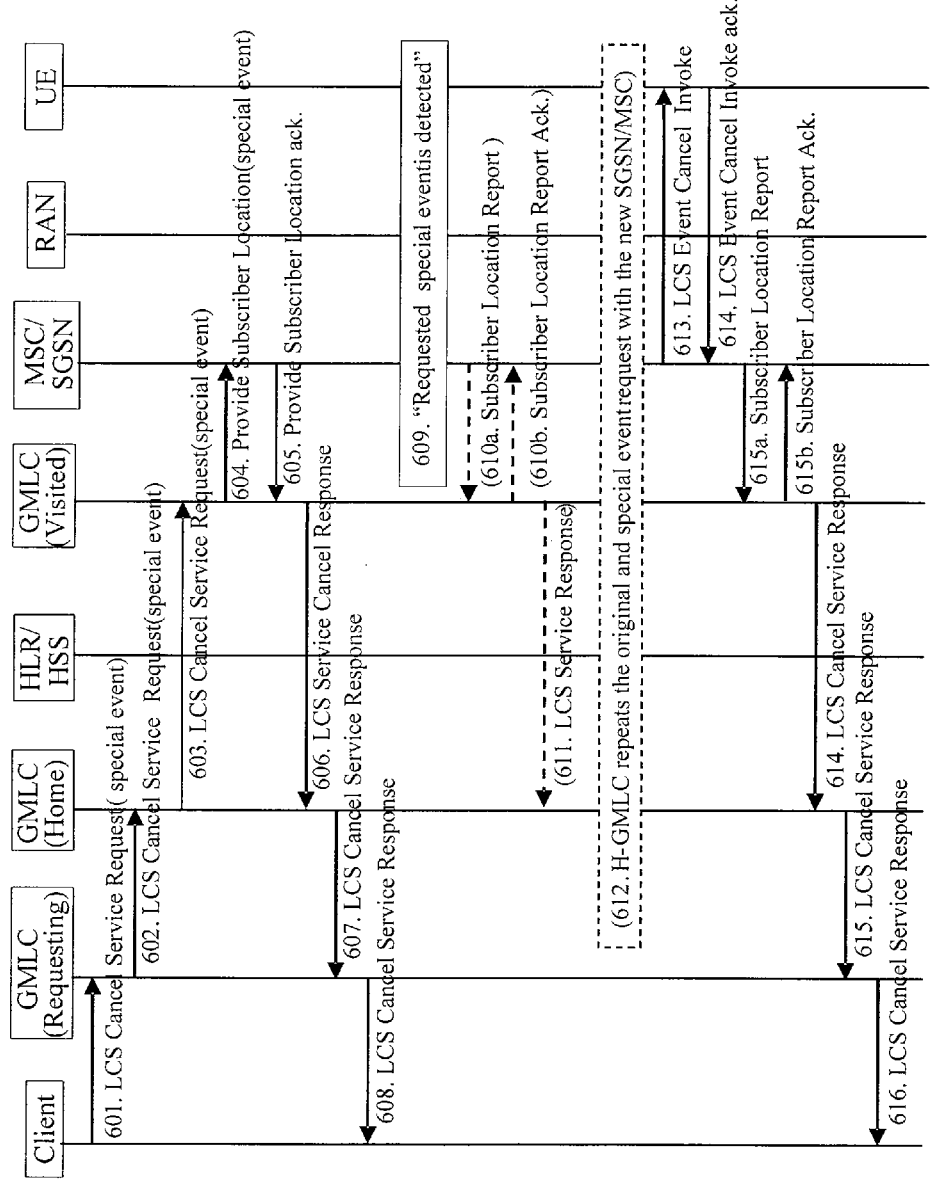
FIG. 6 is a message interaction depiction illustrating a method for a LCS system to send a cancellation of a deferred location request to a target UE according to an embodiment of present invention.

FIG. 6 is a message interaction diagram illustrating a method for a LCS system to send a cancellation of a deferred location request to a target UE according to an embodiment of the present invention. This diagram is merely an example, which should not unduly limit the scope of the claims. One of ordinary skill in the art would recognize many variations, alternatives, and modifications. For example, the LCS Cancel Service Request may be initiated by a LCS Client. In another example, the LCS Cancel Service Request may be issued by the components of the network system based on system internal conditions (e.g., a preset event timer associated to the deferred location request is expired).

The process 451 of the method 400B, in one embodiment, can be illustrated by the process 601 of FIG. 6. For example, the network client is a LCS Client and the network system is a network with LCS system. The LCS Client issues a LCS Cancel Service Request to a network user, a target UE. The LCS Cancel Service Request is sent to a R-GMLC in a network with LCS system, requesting to cancel a previously requested deferred LCS request. For example, the deferred location request is a deferred LCS request that may be triggered by a first event or an original event such as UE change of area event.

Because the deferred LCS request was requested previously, the LCS Client has obtained the LDR reference number assigned to the LCS request (for example, from the LCS Service Response message transmitted by the LCS system, as shown in process 518 of FIG. 5). To cancel the deferred LCS request, the LCS Client may refer to the same LDR reference number in the initiated LCS Cancel Service Request. For example, the cancellation request received by the network system in FIG. 4B is the LCS Cancel Service Request as shown in FIG. 6. In a specific embodiment, the LCS Cancel Service Request further includes information associated with the LDR reference number and a second event which is referred as a special event. In another specific embodiment, the occurrence of the special event may be used to indicate that the target UE is in normal state and to trigger the LCS system to send the Cancel Request to the target UE only when the target UE is in normal state. In one embodiment, the target UE in the normal state or returned to the normal state comprises a UE capable of establishing connection with one of the plurality of MSC/SGSNs in the LCS system through Subscriber Identity Module (SIM) or Universal Subscriber Identity Module (USIM) or other mechanisms.

Referring to FIG. 4B, the process 453 of the method 400B for a network system to process the cancellation request can be illustrated in more detail by the processes 602-604 of FIG. 6. For example, at the process 602 of FIG. 6 according to an embodiment, the R-GMLC sends the LCS Cancel Service Request to a H-GMLC, including the LDR reference number and information associated with the special event. At the process 603 of FIG. 6 according to an embodiment, the H-GMLC forwards the LCS Cancel Service Request to a V-GMLC, including the LDR reference number, information associated with the special event, and the H-GMLC address. At the process 604 of FIG. 6 according to an embodiment, the V-GMLC sends a PSL message to a MSC/SGSN in the LCS system. The PSL message includes the LCS Cancel Service Request for canceling the deferred LCS request indicated by the LDR reference number. In one embodiment, the PSL message further includes the H-GMLC address and the information associated with the special event.

Referring back to FIG. 4B, the process 455 of the method 400B for the network system to return a receipt acknowledgment to network client can be illustrated in more detail by the processes 605-608 of FIG. 6. At the process 605 of FIG. 6 according to an embodiment, after receiving the PSL message including information of the special event, the MSC/SGSN may verify whether the LCS Cancel Service Request indicated by the special event is supported. In one embodiment, if no support, the MSC/SGSN may send a PSL return error message with a suitable cause to the V-GMLC. The V-GMLC may further return a first LCS Service Response message to the LCS Client including error reason. In another embodiment, if the MSC/SGSN supports the LCS Cancel Service Request indicated by the special event, the MSC/SGSN may directly return a PSL Ack. message to the V-GMLC to acknowledge that the cancellation request has been received. In yet another embodiment, the PSL Ack. message includes no information of the UE location or location estimate. Furthermore the PSL Ack. message includes the LDR reference number, H-GMLC address, and an indication of the cancellation request being received.

At the processes 606-608 of FIG. 6 according to certain embodiments, after receiving the PSL Ack. message from the network node MSC/SGSN, the V-GMLC may return a second LCS Service Response message to the LCS Client via the H-GMLC and the R-GMLC, notifying the LCS Client the LCS Cancel Service Request being received by the MSC/SGSN in the LCS system.

The process 461 of the method 400B is for the network system to determine whether the second event occurs. This process may be further illustrated by the processes 609-612 of FIG. 6, including how the network system handles the mobile network user changes its attachment with the network node during the period after the previous location request was sent to the network user. At the process 609 of FIG. 6 according to an embodiment, the first MSC/SGSN that is handling the received LCS Cancel Service Request including information of the special event may verify whether the special event occurs. If the occurrence of the special event is detected, the target UE is identified to be in or returned to a normal state. If not under certain system predetermined conditions (e.g., a timer is expired), the MSC/SGSN may delete the LCS Cancel Service Request, which may be transmitted to the LCS Client in terms of a LCS Service Response message according to certain embodiments of the present invention. In one embodiment, the UE available verification by the first MSC/SGSN can utilize the capabilities of the mobile network with the LCS system or the target UE itself. In another embodiment, the target UE in the normal state or returned to the normal state comprises a UE capable of establishing connection with one of the plurality of MSC/SGSNs in the LCS system through Subscriber Identity Module (SIM) or Universal Subscriber Identity Module (USIM) or other mechanisms. In yet another embodiment, if the target UE is detected by to be in normal state but not moved to other MSC/SGSN in the LCS system, the procedure may be directed to the process 613 and onwards.

At the process 610 of FIG. 6 according to an embodiment, if the target UE is detected by the first MSC/SGSN to be in a normal state but moved to a second MSC/SGSN in the LCS system, the first MSC/SGSN may return a first SLR message to the linked V-GMLC. The first SLR message includes the LDR reference number, the H-GMLC address, and the necessary information indicating that the target UE has moved to a second MSC/SGSN. In another embodiment, the V-GMLC may reply a SLR Ack. message to the first MSC/SGSN.

At the process 611 of FIG. 6 according to an embodiment, the V-GMLC may send a third LCS Service Response message to the H-GMLC, including the LDR reference number and the necessary information indicating that the target UE has moved to a second MSC/SGSN.

At the process 612 of FIG. 6 according to an embodiment, after receiving the third LCS Service Response message including the information indicating that the target UE has moved to a second MSC/SGSN, the H-GMLC may resend the LCS Cancel Service Request including information associated with the special event to a new V-GMLC that is linked to the second MSC/SGSN. Then the new V-GMLC may transfer the LCS Cancel Service Request to the second MSC/SGSN. The procedure restarts from the process 603 and onwards.

Referring back to FIG. 4B, the process 465 is to send a cancellation message to the network user when the network system determines that it can attach the network user via one of its network node. The cancellation message includes information of the previously issued deferred location request indicated by the LDR reference number and is to provide instruction for the network user to cancel the location request. This process can be further illustrated in detail by the processes 613-614 of FIG. 6. At the process 613 of FIG. 6 according to an embodiment, the MSC/SGSN that is current connected the target UE may send a LCS Event Cancel Invoke message to the UE, including the LDR reference number assigned to the deferred LCS request to be cancelled, the H-GMLC address, and the request for the target UE to cancel the deferred LCS request indicated by the LDR reference number.

At the process 614 of FIG. 6 according to an embodiment, the target UE cancels the deferred LCS request that is indicated by the LDR reference number and sends a LCS Event Cancel Invoke Ack. message to the MSC/SGSN as a response, including no event message.

The process 471 of the method 400B is to transmit a cancellation service response to the network client about the successful cancellation of the location request by the network user. This process is described as an example by the processes 615-618 in FIG. 6. At the process 615 of FIG. 6 according to an embodiment, the MSC/SGSN then returns a second SLR message to the V-GMLC, including the LDR reference number, the H-GMLC address, and the information about whether the deferred LCS request indicated by the LDR reference number has been successfully cancelled. The V-GMLC may also reply a SLR Ack. message to the MSC/SGSN.

At the processes 616-618 of FIG. 6 according to certain embodiments, the V-GMLC further return a LCS Cancel Service Response message to the LCS Client via the H-GMLC and R-GMLC. In one embodiment, the LCS Cancel Service Response message includes the LDR reference number and the message indicating that the deferred LCS request with the LDR reference number has been successfully cancelled.

The process 475 of the method 400B, as shown in FIG. 4B, is an exceptional process for the network system to issue a failure message when the second event does not occur, for example, over a predetermined time period. Otherwise, the procedure of cancellation of a deferred location service request according to certain embodiments, as shown in FIG. 4B, of the present invention is completed.

Figure 7A:
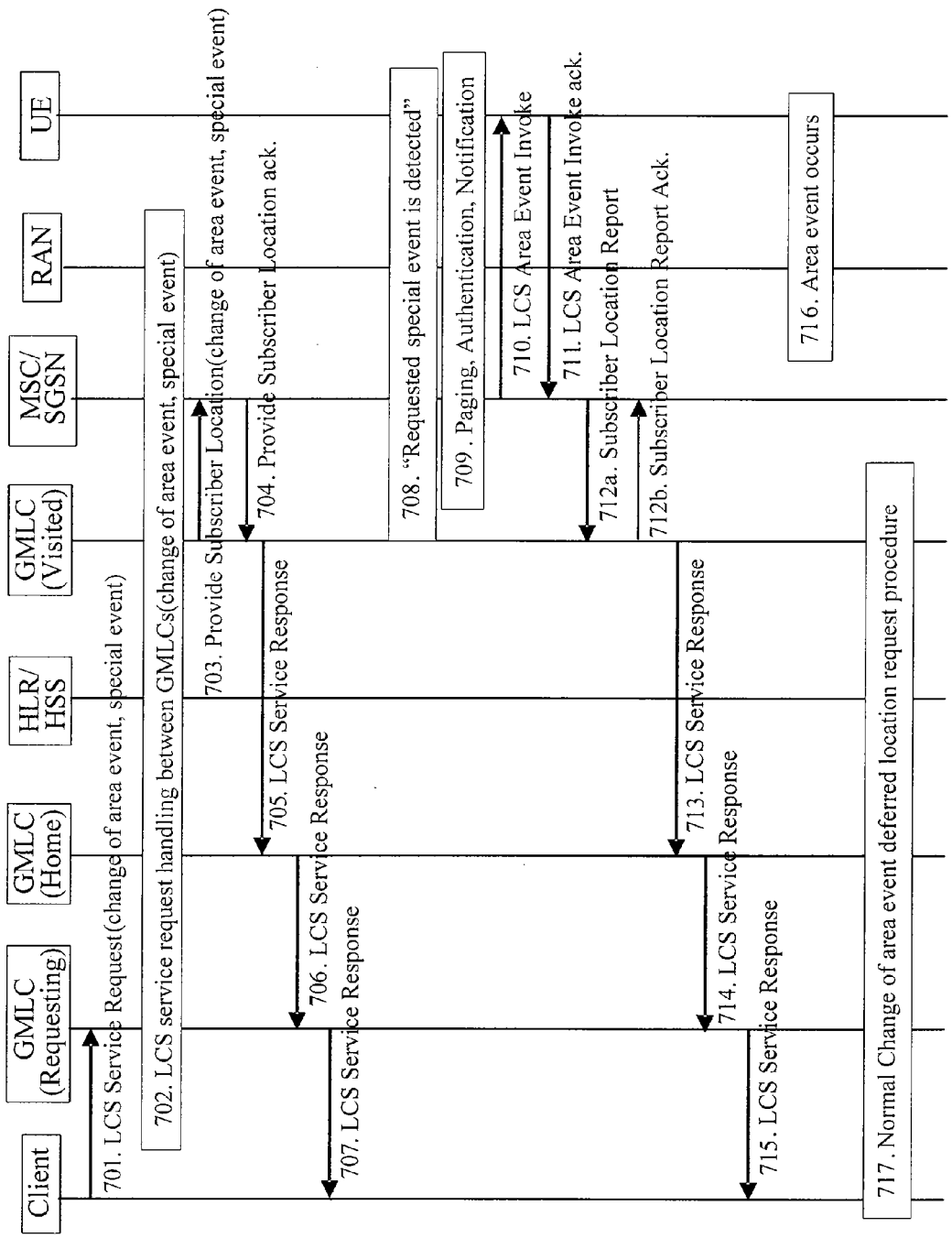
FIG. 7A is a simplified diagram illustrating the message interaction depiction for a LCS system to send a deferred location request of change of area event according to a specific embodiment of present invention.

The present invention can be applied for sending deferred location request associated with various types of events to a plurality of network users. For example, a specific embodiment of the present invention can be illustrated by the depiction of deferred location request procedure for a change of area event. FIG. 7A is a simplified diagram illustrating the message interaction depiction for a LCS system to send a deferred location request of change of area event according to an embodiment of present invention. This diagram is merely an example, which should not unduly limit the scope of the claims. One of ordinary skill in the art would recognize many variations, alternatives, and modifications. More details of the sequence of processes shown in FIG. 7A can be seen in the description below.

Process 701: a LCS Client issues a change of area type deferred LCS Service Request and sends to a R-GMLC in the LCS system. The deferred LCS Service Request contains information about the change of area type deferred location request, i.e. details of the target area and the nature of the event, whether the event to be reported is the UE being inside, entering into or leaving the target area. The LCS Service Request may specify the validity time, i.e. start time and stop time, for sending the deferred location request to LCS system through a GMLC node or for canceling the deferred location request by the R-GMLC. Additionally, if the time expired for the target UE without triggering the area event, the UE may delete this deferred location request. The LCS Service Request may also contain an indication of the minimum interval time between area event reports, if applicable. The LCS Service Request may further contain the information whether the deferred area event may be reported one time only, or several times. If the change of area event is reported one time only, the LCS Service Request may be completed after the first area event has occurred. If the target area is expressed by local coordinate system or geopolitical name, the R-GMLC may convert the target area to geopolitical area expressed by a shape defined in 3GPP Technical Specification TS23.032. In addition to the target area definition, the LCS Client may include the country code of the target area in the area event request.

Furthermore, the LCS Service Request includes information associated with a special event for ensuring the change of area event to be successfully sent to the target UE by the LCS system. In one embodiment, the special event may be related to the target UE in terms of whether the target UE is detected by the LCS system to be in a normal state or return to a normal state which is capable of establishing connection with one of plurality of MSC/SGSNs in the CN of the LCS system. In another embodiment, the special event may be not related to the target UE, which can be pre-selected by the LCS Client (a location service subscriber) or defined by the LCS system (a location service provider).

Process 702: if indication of the requested location estimate is included in the area event request, the R-GMLC should record this indication and any relevant parameters such as Quality of Service (QoS). The information received by the R-GMLC is transferred to the H-GMLC. The H-GMLC assigns a LDR reference number to this LCS Service Request then forwards the information to the V-GMLC, including the LDR reference number, the H-GMLC address, and the information associated with the special event.

Process 703: if the received target area is expressed by a shape defined in 3GPP Technical Specification TS23.032, the V-GMLC converts the target area into an Area Definition consisting of the corresponding list of cell identities, location areas or routing area. If the V-GMLC is not able to translate the target area into network identities, it shall reject the request and send an LCS service response to H-GMLC with the appropriate error reason.

If the received target area is expressed by country code or PLMN identity, the V-GMLC shall use the country code or PLMN identity as the Area Definition.

In a specific embodiment, the V-GMLC sends an Area Definition to a MSC/SGSN in the Provide Subscriber Location (PSL) message including the LDR reference number, the special event information, and the H-GMLC address.

The PSL message may define whether the event to be reported is the UE being inside, entering into or leaving the area. The PSL message may also include the minimum interval time between area event reports, the information whether the deferred area event may be reported one time only or several times, if applicable.

Process 704: the MSC/SGSN verifies the UE capabilities with regard to the change of area event. If either the MSC/SGSN or the UE does not support the deferred location request for the change of area event (for temporary or permanent reasons), a PSL return error message may be sent with a suitable cause to the V-GMLC. If the UE is in idle mode, the central network (CN) performs paging, authentication and ciphering. If both the MSC/SGSN and the UE does support the deferred location request for the change of area event, and the MSC/SGSN also supports the special event, the MSC/SGSN may return a PSL Ack. message to the V-GMLC indicating that the service task has been received. The PSL Ack. message further includes the LDR reference number, the H-GMLC address, and an indication of LCS Service Request being received.

Processes 705-707: the V-GMLC transmits a first LCS Service Response message to the LCS Client via H-GMLC and the R-GMLC, notifying the LCS Client that the LCS Service Request has been successfully received by the MSC/SGSN. The first LCS Service Response message includes the LDR reference number.

Process 708: The network with LCS system, particularly the MSC/SGSN detects that the special event (included in the PSL message) occurs, indicating that the target UE is in or has returned to a normal state.

Process 709: if the UE (being in a normal state) is in idle mode, the central network (CN) performs paging, authentication and ciphering. If privacy notification/verification is requested, the MSC/SGSN may send an LCS Location Notification Invoke message to the target UE indicating the change of area type deferred location request and whether privacy verification is required. If privacy verification was requested, the UE may return an LCS Location Notification Return Result to the MSC/SGSN indicating whether permission is granted or denied.

Process 710: after the MSC/SGSN verifies the UE in normal state, the MSC/SGSN may send a LCS Area Event Invoke message to the target UE carrying the Area Definition, other area event information, the LDR reference number, and the H-GMLC address. The message may define whether the event to be reported is the UE being inside, entering into, leaving the area. The message may also include the minimum interval time between area event reports and the information whether the deferred area event may be reported one time only, or several times, if applicable.

Process 711: if the LCS Area Event Invoke message is successfully received by the target UE which supports the change of area type deferred location request, the target UE may send an acknowledgement message to the MSC/SGSN and begin monitoring for the change of area event. The target UE may determine whether it is inside, entering into or leaving the target area by comparing the current serving cell identity, location area, routing area, PLMN identity or country code to the Area Definition received from the MSC/SGSN. In case of soft handover, it is sufficient to determine if one of the cells belongs to the target area. In case the Area Definition consists of a location or routing area, PLMN or country identity the target UE may check for the area event during the normal location or routing area update procedure. The change of area event detection mechanism must not influence on the normal UE cell selection and reselection procedures. If the target UE does not support the deferred LCS Service Request (for temporary or permanent reasons), it may send a LCS Area Event Invoke Ack. message with an appropriate error cause to the MSC/SGSN.

Process 712: the MSC/SGSN may return a Subscriber Location Report (SLR) message to the V-GMLC without a location estimate. The MSC/SGSN may include the result of the notification/verification in the SLR message, if the notification/verification is needed. The SLR message may also include the LDR reference number and the H-GMLC address. The change of area event invoke result may be also included, if necessary. The V-GMLC may reply a SLR Ack. message to the MSC/SGSN as an acknowledgment.

Processes 713-715: The V-GMLC may transmit a second LCS Service Response message to the LCS Client via the H-GMLC and the R-GMLC, notifying the LCS Client about the receipt of the LCS Service Request by the target UE.

Process 716: the target UE detects that the requested change of area event occurs.

Process 717: continuing the subsequent procedures of the change of area type deferred location request as in existing technology.

Figure 7B:
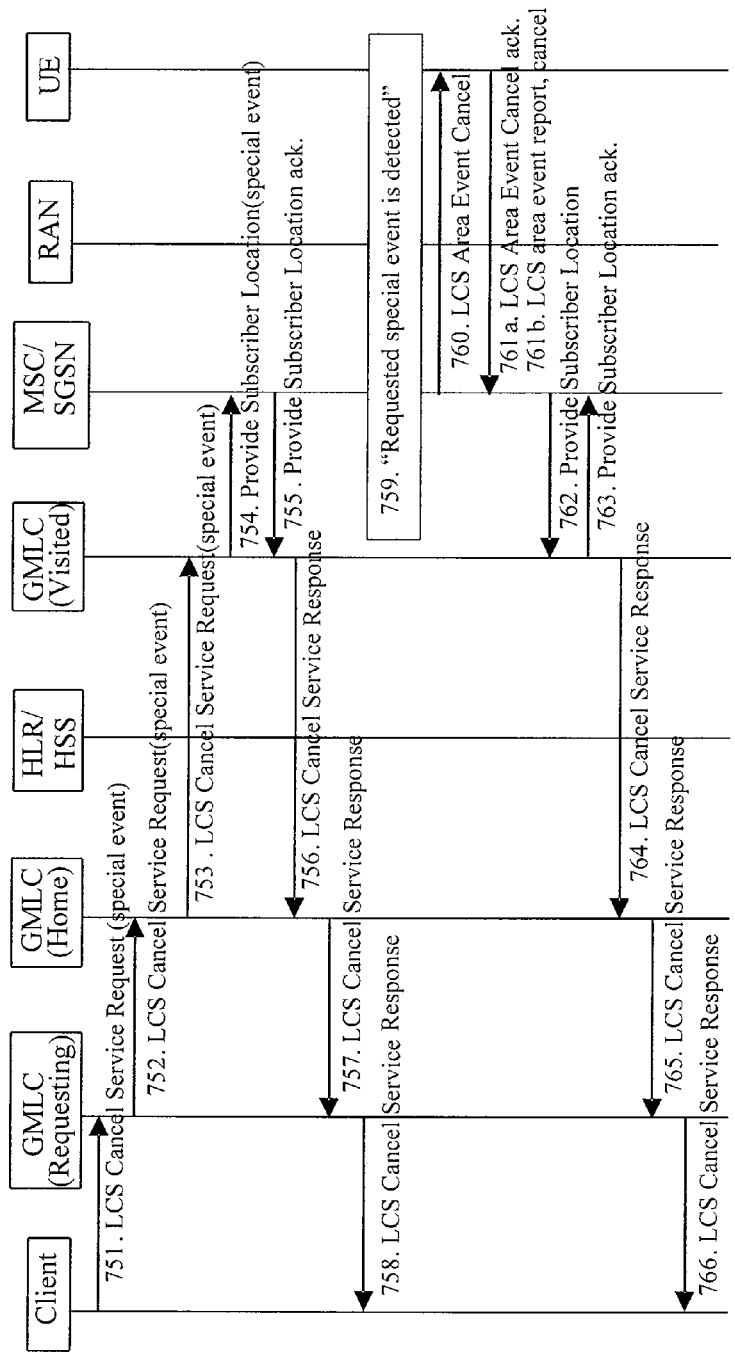
FIG. 7B is a simplified diagram illustrating the message interaction depiction for a LCS system to send a cancellation request to cancel a previously requested deferred area event location request according to a specific embodiment of present invention.

In another example, the embodiments of the present invention can be illustrated in procedures of sending a cancellation of a deferred location request with change of area event. FIG. 7B is a simplified diagram illustrating the message interaction diagram for a LCS system to cancel a previously requested deferred area event location request according to an embodiment of present invention. This diagram is merely an example, which should not unduly limit the scope of the claims. One of ordinary skill in the art would recognize many variations, alternatives, and modifications.

Process 751: a LCS Client sends a cancellation request to a target UE to a R-GMLC of a LCS system for canceling a previously requested change of area event type deferred location request. Because of the change of area type deferred location request is previously requested, during the original deferred location request procedure the LCS Client has received an indication of the original request with an assigned LDR reference number. Now the LCS Client may still refer the same LDR reference number in the LCS cancellation request. Additionally, in a specific embodiment, the cancellation request may include information of a special event for indicating that the LCS Client requests to send the cancellation request only when the target UE is detected, by the LCS system, to be in a normal state.

Process 752: the R-GMLC may forward the cancellation request to a H-GMLC, including the LDR reference number and information associated with the special event.

Process 753: the H-GMLC may transfer the cancellation request to a V-GMLC, including the LDR reference number, the H-GMLC address, and information associated with the special event.

Process 754: the V-GMLC may send a first PSL message to a MSC/SGSN that the target UE belongs, including the cancellation request of the deferred location request indicated by the LDR reference number, the H-GMLC address, and information associated with the special event.

Process 755: the MSC/SGSN may reply a first PSL Ack. message to the V-GMLC.

Processes 756-758: the V-GMLC may return a first LCS Service Response message to the LCS Client via the H-GMLC and the R-GMLC, notifying the receipt of the cancellation request by the LCS system.

Process 759: the network including the LCS system detects that the special event occurs, indicating that the target UE is in or returns to a normal state. In other words, the UE is capable of establishing connection with one of plurality of the MSC/SGSNs in the LCS system. In a specific embodiment, the detection of the UE in or returned to the normal state may be indicated by occurrence of the special event determined by the LCS system. The detection mechanism by the LCS system may comprise utilizing the capabilities of the mobile network and the UE itself.

Process 760: the MSC/SGSN, that is currently connected with the target UE, may send a LCS Area Event Cancel message to the UE, including the LDR reference number, the H-GMLC address, and the request for the UE to cancel the area event deferred location request indicated by the LDR reference number.

Process 761a: the target UE cancels the area event deferred location request and sends a LCS Area Event Cancel Ack. message to the MSC/SGSN as a response without any area event information.

Process 761b: when the UE is monitoring whether the area event occurs or not, the target UE may send a LCS Area Event Report message to the MSC/SGSN, including the LDR reference number, cancellation request and relevant error code. In a specific embodiment, the message indicates that the target UE may cancel or delete the change of area type deferred location request on behave of itself.

Process 762: the MSC/SGSN may return, after receiving the LCS Area Event Cancel Ack. message from the target UE, a second PSL message to the V-GMLC, including the LDR reference number and the H-GMLC address.

Process 763: the V-GMLC replies a second PSL Ack. message to the MSC/SGSN.

Process 764: the V-GMLC further may send a second LCS Service Response message to the H-GMLC, including the LDR reference number and the H-GMLC address.

Process 765: the H-GMLC further sends the second LCS Service Response message to the R-GMLC, including the LDR reference number.

Process 766: the R-GMLC returns the second LCS Service Response message to the LCS Client, notifying the LCS Client that the area event driven deferred location request is successfully canceled.

Figure 8A:
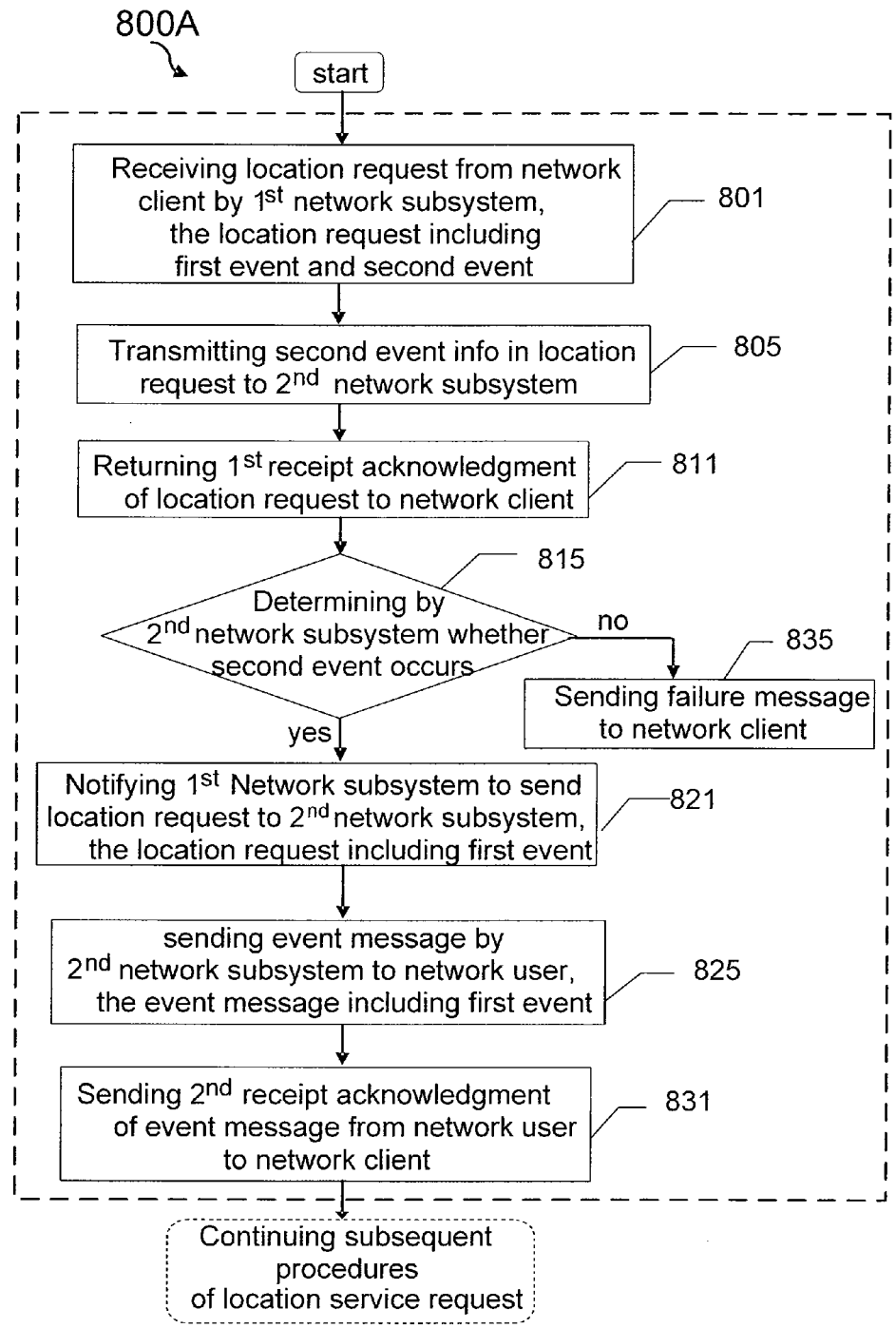
FIG. 8A is a flowchart illustrating a method for a network system to send a location service request to a network user according to another embodiment of present invention.

FIG. 8A is a flowchart illustrating a method 800A to send a location service request according to another embodiment of present invention. This diagram is merely an example, which should not unduly limit the scope of the claimed herein. One of ordinary skill in the art would recognize many variations, alternatives, and modifications. For example, various processes may be added, removed, replaced, repeated, and/or partially overlapped. The method 800A for a network system to send a location service request to a network user includes the following processes:

1. Process 801 for receiving location request including information associated with a first event and information associated with a second event by first network subsystem from a network client;
2. Process 805 for transferring the second event information in the location request from first network subsystem to second network subsystem;
3. Process 811 for returning a first receipt acknowledgment of the location request to the network client;
4. Process 815 for determining by the second network subsystem whether the second event occurs; if no, goes to Process 841; if yes, goes to Process 821;
5. Process 821 for notifying first network subsystem to send location request including information associated with the first event to second network subsystem;
6. Process 825 for sending an event message including information associated with the first event by second network subsystem to network user;
7. Process 831 for returning a second receipt acknowledgment of the location request including the event message from the network user to the first network subsystem;
8. Process 835 for sending the second receipt acknowledgment by the first network subsystem to the network client; and
9. Process 841 for sending a failure message of the location request to the network client.

The above sequence of processes provides a method according to an embodiment of the present invention. Other alternatives can also be provided where processes are added, one or more processes are removed, or one or more processes are provided in a different sequence without departing from the scope of the claims herein. The method 800A described in FIG. 8A can be illustrated in more details through the procedures shown in FIG. 9 in accordance with certain embodiments of present invention.

Figure 9:
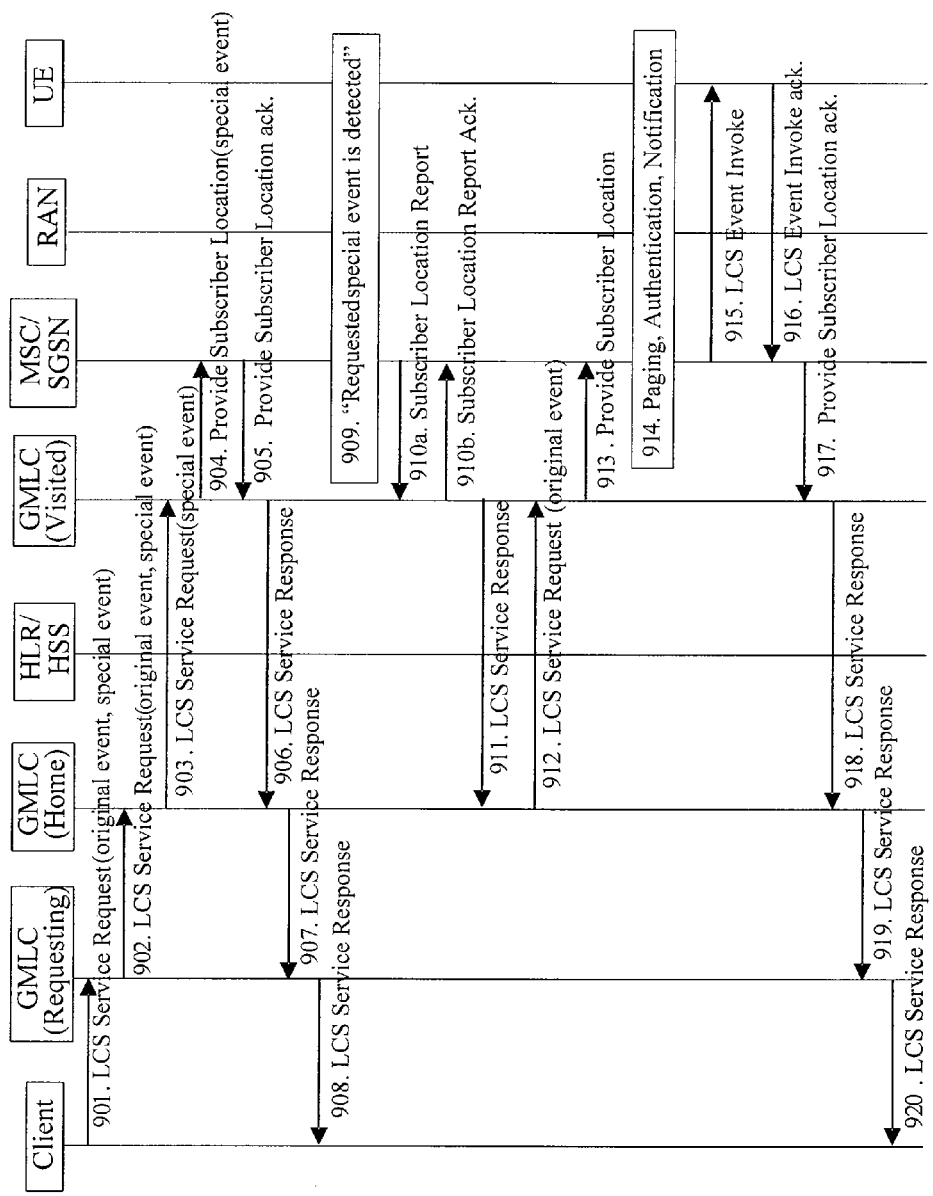
FIG. 9 is a message interaction depiction illustrating a method for sending a location request to a user equipment according to an embodiment of present invention.

FIG. 9 is a message interaction depiction illustrating a method for sending a location request to a user equipment according to an embodiment of present invention. This diagram is merely an example, which should not unduly limit the scope of the claimed herein. One of ordinary skill in the art would recognize many variations, alternatives, and modifications.

Process 801: the network system includes a first network subsystem. The first network subsystem receives a location request from a network client. The location request, in one embodiment, comprises information associated with a first event and information associated with a second event. In another embodiment, the location request may be initiated by the network system itself including the first network subsystem, the second network subsystem, or other network components. Furthermore, the Process 801 can be illustrated in more details by the processes 901-902 in FIG. 9 according to certain embodiments of the present invention.

As an example shown in FIG. 9, the network system may be illustrated as a network with LCS system. The network client may be a LCS Client or simply the Client. The network user may be a target UE or simply the UE. In one embodiment, the first network subsystem may be a Requesting GMLC (R-GMLC) and/or a Home GMLC (H-GMLC) in the LCS system. In another embodiment, the second network subsystem may be a combination of a Visited GMLC (V-GMLC) and a linked MSC/SGSN network node in the LCS system. As shown in FIG. 9 in one embodiment, the first event may be an original event associated with the deferred LCS Service Request whose occurrence shall be detected by the target UE to trigger the positioning of the UE and location information report to the LCS system. As shown in FIG. 9, the second event may be an added special event associated with the deferred LCS Service Request whose occurrence shall be monitored by the second network subsystem for ensuring the LCS Service Request with the first event to be successfully received by the target UE.

At the process 901 in FIG. 9 according to an embodiment of the present invention, the location request may be a deferred Location Service (LCS) Request to the UE initiated by the Client. The LCS Service Request is sent to a Requesting GMLC (R-GMLC) in the LCS system by the Client. In a specific embodiment, the LCS Service Request may be initiated by the components of the network system such as R-GMLC, H-GMLC, V-GMLC, and MSC/SGSN in the LCS system based on system internal conditions.

At the process 902 in FIG. 9 according to an embodiment, the LCS Service Request is forwarded by the R-GMLC to a H-GMLC, i.e., the first network subsystem described in FIG. 8A. The LCS Service Request includes information associated with the original event and the added special event.

Process 805: the first network subsystem transmitting the second event information in the location request to the second network subsystem. According to certain embodiments, the Process 805 may be illustrated in details by the processes 903-904 in FIG. 9 as the followings: at the process 903, after receiving the LCS Service Request, the H-GMLC assigns a LDR reference number to this LCS Service request and then sends a LCS Service Request message including information of the special event, the assigned LDR reference number, and the H-GMLC address to a V-GMLC via a network storage server (HLS/HSS). Then the LCS Service Request message is handled within the components of the second network subsystem. At the process 904, the V-GMLC transmits the LCS Service Request message to a MSC/SGSN in terms of a first PSL request including the special event information, the LDR reference number assigned for the LCS Service Request, and the H-GMLC address.

Process 811: returning a first receipt acknowledgment of the location request by the network system to the network client. Using FIG. 9 as an example, the process 811 may be illustrated by the processes 905-908 in details accord to certain embodiments.

At the process 905 of FIG. 9 according to an embodiment, after receiving the first PSL request including the special event information, the MSC/SGSN may verify whether the LCS Service Request indicated by the special event is supported. If not supported, the MSC/SGSN may send a PSL Return Error message with corresponding causes to the V-GMLC. The V-GMLC may further return a first LCS Service Response message with error causes to the LCS Client via the H-GMLC and the R-GMLC. The first receipt acknowledgment in FIG. 8A comprises the first LCS Service Response message.

In one embodiment, if the MSC/SGSN supports the LCS Service Request indicated with the special event, the MSC/SGSN may directly return a first PSL Ack. message to the V-GMLC, indicating that the location request has been received by the MSC/SGSN. In a specific embodiment, the first PSL Ack. message includes the LDR reference number, H-GMLC address, and an indication of the location request being received.

At the processes 906-908 in FIG. 9 according to certain embodiments, the V-GMLC further returns a second LCS Service Response message to the Client via H-GMLC and R-GMLC, notifying the network client about the receipt information of the LCS Service Request with the special event by the MSC/SGSN in the LCS system. In a specific embodiment, the first receipt acknowledgment in FIG. 8A comprises the second LCS Service Response message.

Process 815 of FIG. 8A: determining by the second network system whether the second event occurs. if yes, the method 800A performs Process 821, if not occur under certain conditions, the method 800A performs Process 835. Further detail of the Process 815 may be illustrated by the process 909 in FIG. 9 as an example.

In one embodiment, the second event comprises the special event in FIG. 9. At the process 909 of FIG. 9 according to an embodiment, the second network subsystem, particularly the MSC/SGSN within the second network subsystem detects that special event occurs, indicating that the UE is in or has returned to a normal state. In one embodiment, the detection by the second network subsystem can utilize the capabilities of the mobile network with LCS system or the target UE itself. In another embodiment, the network user in the normal state or returned to the normal state comprises a target UE capable of establishing connection with one of the plurality of MSC/SGSNs in the LCS system through Subscriber Identity Module (SIM) or Universal Subscriber Identity Module (USIM) or other mechanisms. In another embodiment the second event may be not related to the network user, thus it may be pre-selected by the network client or defined independently by the network system.

Process 821: notifying the first network subsystem to send location request including information associated with the first event to the second network subsystem. Further details of the Process 821 may be illustrated by the processes 910-913 in FIG. 9 according to certain embodiments of the present invention.

At the process 910a of FIG. 9 according to an embodiment, once the UE is detected to be in or have returned to a normal state by the first MSC/SGSN, the first MSC/SGSN may send a Subscriber Location Report (SLR) message to the V-GMLC, informing that the target UE has been in or returned to a normal state. The SLR message includes the LDR reference number and the H-GMLC address. In one embodiment, if the UE has moved to a second MSC/SGSN, the SLR message may also include the address of the second MSC/SGSN and the necessary message indicating that the UE has moved to the second MSC/SGSN.

At the process 910b of FIG. 9 according to an embodiment, the V-GMLC may reply a SLR Ack. message to the first MSC/SGSN as a response.

At the process 911 of FIG. 9 according to an embodiment, after receiving the SLR message, the V-GMLC may return a third LCS Service Response message to the H-GMLC, including the LDR reference number and the information that the target UE has been in or returned to a normal state. In one embodiment, if the UE has moved to a second MSC/SGSN, the third LCS Service Response message may also include the address of the second MSC/SGSN and the necessary message indicating that the UE has moved to the second MSC/SGSN. In a specific embodiment, the first receipt acknowledgment in FIG. 8A comprises the third LCS Service Response message.

At the process 912 of FIG. 9 according to an embodiment, based on the received third LCS Service Response message, the H-GMLC may send a LCS Service Request including information associated with the original event to the V-GMLC linked to the MSC/SGSN that the UE currently belongs. The LCS Service Request also includes necessary message with respect to the original event, the LDR reference number, and the H-GMLC address. In one embodiment, if the UE has moved to a second MSC/SGSN, the LCS Service Request may be sent to a new V-GMLC linked to the second MSC/SGSN.

At the process 913 of FIG. 9 according to an embodiment, the V-GMLC further may send a second PSL request to the MSC/SGSN that the UE currently belongs. The second PSL request carries all information from the H-GMLC including the original event information and corresponding message for the UE.

Process 825: sending an event message including information associated with the first event by second network subsystem to network user. Further details of the Process 825 may be illustrated by the processes 914-915 in FIG. 9 according to certain embodiments of the present invention.

At the process 914 of FIG. 9 according to an embodiment, if the target UE is detected to be in a idle mode by the MSC/SGSN where the target UE currently belongs, the core network (CN) may perform paging, authentication and ciphering. In one embodiment, if privacy notification/verification is requested, the MSC/SGSN sends an LCS Location Notification Invoke message to the target UE indicating that this is an event driven deferred LCS request and whether privacy verification is required. If privacy verification was requested, the target UE may return an LCS Location Notification Return Result to the MSC/SGSN, indicating whether permission is granted or denied.

At the process 915 of FIG. 9 according to an embodiment, the MSC/SGSN sends a LCS event Invoke message to the target UE, including the necessary message corresponding to the original event, the LDR reference number, and the H-GMLC address.

Process 831: returning a second receipt acknowledgment of the event message from the network user to the first network subsystem. Further details of the Process 831 of FIG. 8A may be illustrated by the processes 916-917 in FIG. 9 according to certain embodiments of the present invention.

At the process 916 of FIG. 9 according to an embodiment, if the target UE successfully receives the LCS event Invoke message and does support the LCS Service Request indicated by the original event, the target UE may reply a LCS Event Invoke Ack. message to the MSC/SGSN as a success response and start the corresponding event process. In one embodiment, if the UE does not support the LCS Service Request indicated by the original event, then the returned LCS Event Invoke Ack. message may carry a corresponding error reason.

At the process 917 of FIG. 9 according to an embodiment, after receiving the LCS Event Invoke Ack. message from the target UE, the MSC/SGSN may return a second PSL Ack. message to the V-GMLC. The second PSL Ack. message carries information about whether the original event has been successfully sent to the UE or not, the LDR reference number, and the H-GMLC address.

Process 835: sending the second receipt acknowledgment by the first network subsystem to the network client. Further detail can be found in the processes 918-920 of FIG. 9. At the processes 918-920 of FIG. 9 according to certain embodiments, the V-GMLC may transmit a fourth LCS Service Response message to the Client via the H-GMLC and the R-GMLC, notifying the Client whether the original event has been successfully sent to the UE or not. In a specific embodiment, the second receipt acknowledgment described in FIG. 8A comprises the fourth LCS Service Response message.

Now the procedures of sending a location request according to another embodiment of present invention are completed. Further the network system and the network user may continue subsequent procedures of original event driven deferred location request as in existing technology.

Alternatively, at Process 815 of the method 800A, if the network system determines that the second (special) event does not occur under certain conditions preset by the network client or the network system, the network system may perform Process 841 to send a failure message back to the network client. In one embodiment, the preset conditions for determining the occurrence of the second event may comprise a maximum time period. The time period may start from a first time of information associated with the second event being received by the network system and ending at a second time defined by the network client or predetermined by the network system. In one embodiment, the failure message may be returned to the network client in terms of the LCS Service Response message as shown in FIG. 5.

Figure 8B:
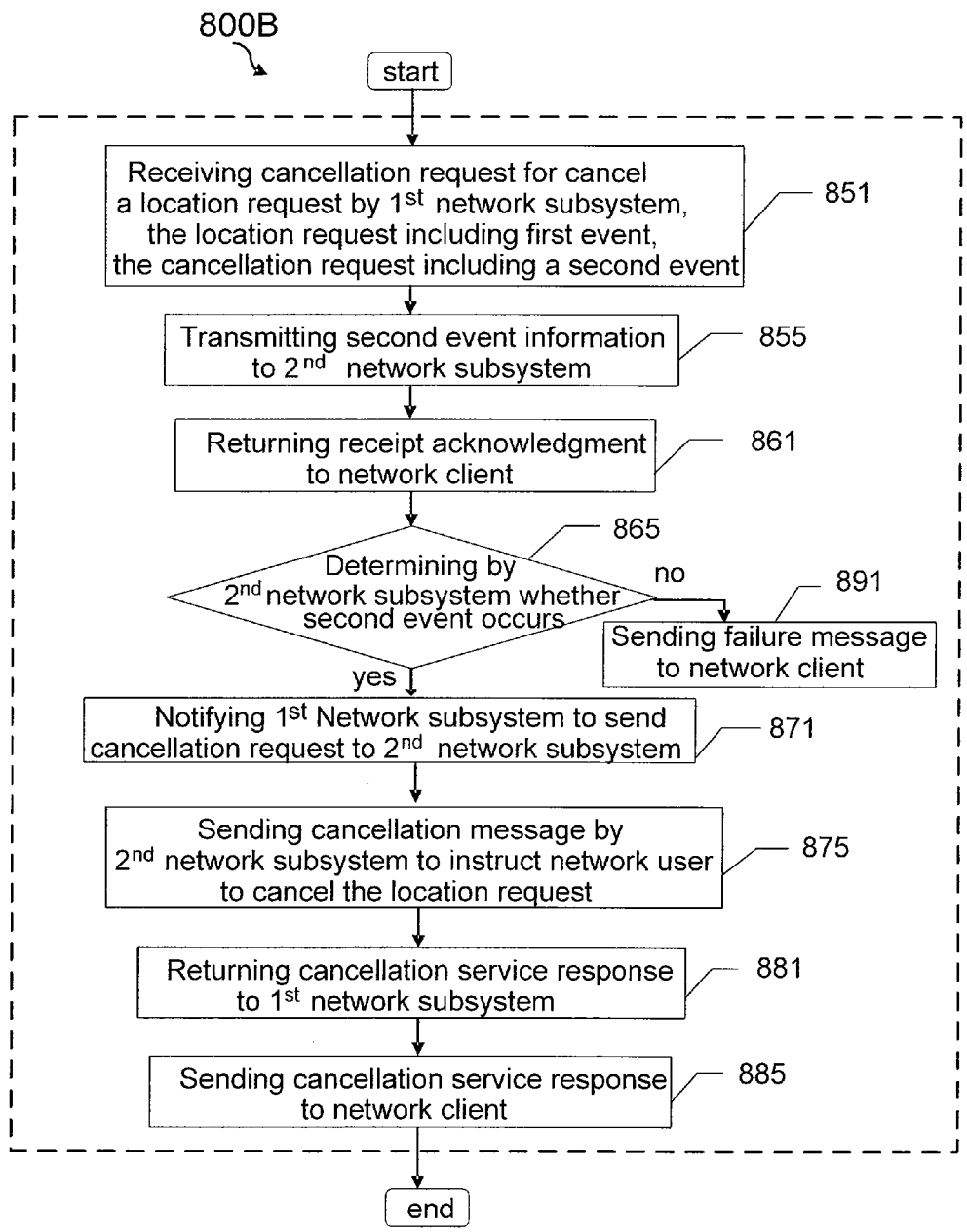
FIG. 8B is a flowchart illustrating a method for a network system to send a cancellation request of a location request to a network user according to another embodiment of present invention.

FIG. 8B is a flowchart illustrating a method 800B to send a cancellation request to cancel a location service request according to another embodiment of present invention. This diagram is merely an example, which should not unduly limit the scope of the claimed herein. One of ordinary skill in the art would recognize many variations, alternatives, and modifications. For example, various processes may be added, removed, replaced, repeated, and/or partially overlapped. The method 800B for a network system to send a cancellation request of a location service request to a network user includes the following processes:

1. Process 851 for receiving cancellation request of a location request to a network user by a first network subsystem from a network client, the location request including information associated with a first event and the cancellation request including information associated with a second event;

2. Process 855 for transferring the second event information from the first network subsystem to second network subsystem;

3. Process 861 for returning a receipt acknowledgment to the network client;

4. Process 865 for determining by the second network subsystem whether the second event occurs; if no, goes to Process 891; if yes, goes to Process 871;

5. Process 871 for notifying first network subsystem to send cancellation request of the location request to second network subsystem;

6. Process 875 for sending a cancellation message by second network subsystem to instruct the network user to cancel the location request;

7. Process 881 for returning a cancellation service response from the network user to the first network subsystem;

8. Process 885 for sending the cancellation service response to the network client; and 9. Process 891 for sending a failure message of the cancellation request to the network client.

The above sequence of processes provides a method according to an embodiment of the present invention. Other alternatives can also be provided where processes are added, one or more processes are removed, or one or more processes are provided in a different sequence without departing from the scope of the claims herein. The method 800B described in FIG. 8B can be illustrated in more details through the procedures shown in FIG. 10 in accordance with certain embodiments of present invention.

Figure 10:
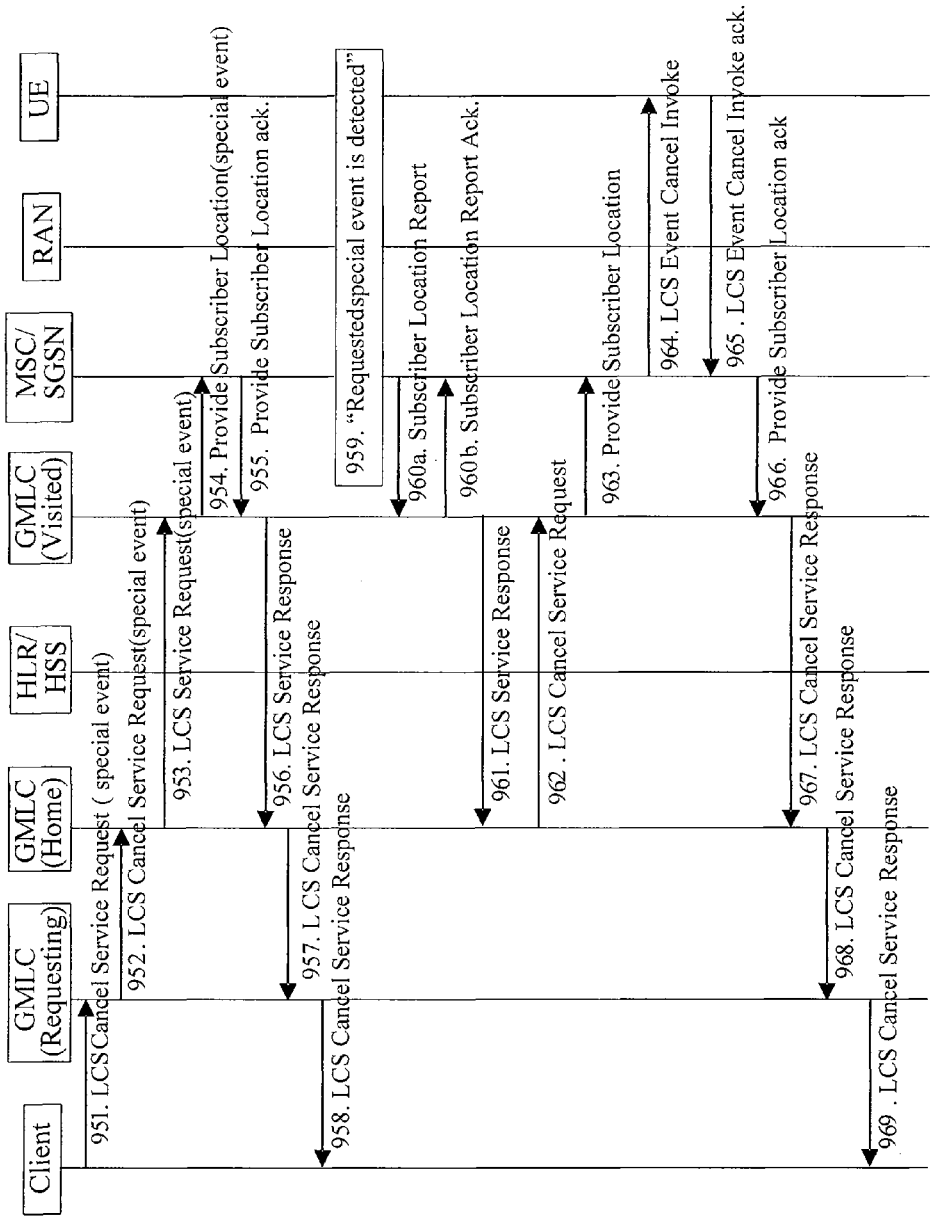
FIG. 10 is a message interaction depiction illustrating a method for sending a cancellation of a previously requested deferred location request to a user equipment according to an embodiment of present invention.

FIG. 10 is a message interaction diagram illustrating a method for sending a cancellation of a previously requested deferred location request to a user equipment according to another embodiment of present invention. This diagram is merely an example, which should not unduly limit the scope of the claimed herein. One of ordinary skill in the art would recognize many variations, alternatives, and modifications.

The process 851 of the method 800B, in one embodiment, can be directly illustrated by the processes 951 and 952 of FIG. 10. For example, the network client is a LCS Client. The network system includes a first network subsystem and a second network subsystem. The first network subsystem may includes a R-GMLC and a H-GMLC in a LCS system. The LCS client issued a cancellation request to a network user for canceling a location request sent to the network user, a target UE. At the process 951 of FIG. 10 according to an embodiment, a LCS Client issues a LCS Cancel Service Request for target UE. The R-GMLC of a LCS system receives the LCS Cancel Service Request for canceling a previously requested deferred location request. Because the deferred location request is previously requested and driven by an original event (for example, the original event is the first event to trigger the response to the location request), the LCS Client has received an assigned LDR reference number indicated for the deferred location request. Now the LCS Client may still refer the same LDR reference number in the LCS Cancel Service Request. Additionally, in a specific embodiment, the cancellation request may include information of a special event (for example, the special event is the second event) for indicating that the LCS Client may send the cancellation request only when the target UE is detected, by the LCS system, to be in a normal state that is capable of being attached with a network node in the LCS system.

In certain embodiments, network components such as R-GMLC, H-GMLC, V-GMLC or MSC/SGSN may also initiate the Cancel Service request on its own behave based on system internal situation (for example, a system timer is expired, etc.)

At the process 952 of FIG. 10 according to an embodiment, the R-GMLC may forward the LCS Cancel Service Request to a H-GMLC, including the LDR reference number assigned to the location request to be canceled, and information associated with the special event.

Referring to FIG. 8B, the process 855 of the method 800B is for transferring the second event information contained in the cancellation request to a second network subsystem. For example, the second network subsystem includes a V-GMLC and one of MSC/SGSN network node. In one embodiment, the process 855 can be illustrated in the processes 953 and 954 of FIG. 10. At the process 953 according to an embodiment, based on the received LCS Cancel Service Request the H-GMLC may send a LCS Service Request message associated with the special event to a V-GMLC in the LCS system via a HLR/HSS user data storage server. The LCS Service Request includes the LDR reference number, the special event information, and a H-GMLC address. At the process 954 of FIG. 10 according to an embodiment, the V-GMLC may send a first Provide Subscriber Location (PSL) request message to a MSC/SGSN for requesting cancellation of the deferred location request indicated by the LDR reference number. The first PSL request message also includes the H-GMLC address and the special event information.

The process 861 of the method 800B is for the first network subsystem to return a receipt acknowledgment to the network client, notifying that second event information associated with the cancellation request has been received by the second network subsystem. The process can be illustrated in more detail by the processes 955-958 of FIG. 10. At the process 955 of FIG. 10 according to an embodiment, after receiving the PSL request message, the MSC/SGSN may verify that if it supports the LCS Service Request indicated by the special event. In one embodiment, if no support, the MSC/SGSN may send a PSL return error message with a suitable cause back to the V-GMLC. The V-GMLC then returns a first LCS Service Response message to the H-GMLC carrying an error reason. The H-GMLC may further return a first LCS Cancel Service Response message to the LCS Client via the R-GMLC, including the error reason. In another embodiment, if the MSC/SGSN supports the LCS Service Request indicated by the special event, then the MSC/SGSN may directly return a first PSL Ack. message with the H-GMLC address to the V-GMLC as a response, indicating that the request including the special event information is received.

At the process 956 of FIG. 10 according to an embodiment, the V-GMLC may further return a second LCS Service Response message to the H-GMLC, indicating that the request including the special event information is received.

At the processes 957 and 958 of FIG. 10 according to certain embodiments, the H-GMLC further may transmit a second LCS Cancel Service Response message to the LCS Client via the R-GMLC, notifying the LCS Client that the special event information is received by the MSC/SGSN.

Referring again to FIG. 8B, the process 865 of the method 800B is for determining whether the second event occurs by the second network subsystem. If the second event is determined to have occurred, continue the rest of the procedures for sending the cancellation request. This process can be described in more detail in the process 959 of FIG. 10. At the process 959 of FIG. 10 according to an embodiment, the first MSC/SGSN that is handling the first PSL request message detects the occurrence of the special event indicating that the target UE is in or has returned to a normal state. In one embodiment, the UE in the normal state or returned to the normal state is capable of establishing connection with one of the plurality of MSC/SGSNs in the LCS system through Subscriber Identity Module (SIM) or Universal Subscriber Identity Module (USIM) or other mechanisms. In another embodiment, the UE available detection by the first MSC/SGSN can utilize the capabilities of the mobile network with LCS system or the target UE itself. In yet another embodiment, the special event may be not related to the UE, thus it may be pre-selected by the LCS Client or defined independently by the LCS System.

If the second event is detected to occur, i.e., the network user is capable of being attached, the process 871 of the method 800B demonstrates that the second network subsystem notifies the first network subsystem to send the cancellation request and the second network subsystem. More details can be seen in the processes 960-962 of FIG. 10. At the process 960 of FIG. 10 according to an embodiment, once the UE is detected to be in or have returned to a normal state by the first MSC/SGSN, the first MSC/SGSN may send a first Subscriber Location Report (SLR) message to the V-GMLC, informing that the UE has been in or returned to a normal state. The first SLR message includes the LDR reference number and the H-GMLC address. In another embodiment, if the UE has moved to a second MSC/SGSN, the first SLR message may also include the address of the second MSC/SGSN and the necessary message indicating that the UE has moved to the second MSC/SGSN. The V-GMLC may reply a SLR Ack. message to the first MSC/SGSN as a response.

At the process 961 of FIG. 10 according to an embodiment, the V-GMLC may send a third LCS Service Response message to the H-GMLC, including the LDR reference number and the information that the UE has been in or returned to a normal state. In one embodiment, if the UE has moved to a second MSC/SGSN, the third LCS Service Response message may also carry an address of the second MSC/SGSN and necessary message indicating that the UE has moved to the second MSC/SGSN.

At the process 962 of FIG. 10 according to an embodiment, based on the received LCS Service Response message, the H-GMLC then sends the LCS Cancel Service Request (received at the process 952 of FIG. 10) to the V-GMLC corresponding to the MSC/SGSN with which the UE currently connects. The LCS Cancel Service Request includes the LDR reference number, the H-GMLC address, and a cancellation request for the deferred location request indicated by the LDR reference number. In one embodiment, if the UE has moved to a second MSC/SGSN, then the LCS Cancel Service Request will be sent to the V-GMLC corresponding to the second MSC/SGSN.

The second network subsystem, after receiving the cancellation request, may send a cancellation message to the network user and instruct the network user to cancel the location request indicated by the LDR reference number included in the cancellation request. The process 875 of the method 800B can be illustrated in more detail by the processes 963-965 of FIG. 10. At the process 963 of FIG. 10 according to an embodiment, the V-GMLC then transmits the LCS Cancel Service Request in terms of a second PSL request to the MSC/SGSN that the UE currently belongs, including all information obtained from the H-GMLC.

At the process 964 of FIG. 10 according to an embodiment, the MSC/SGSN in which the UE currently is located may send a LCS Event Cancel Invoke message to the target UE. The LCS Event Cancel Invoke message includes the LDR reference number, the H-GMLC address, and the cancellation request for the UE to cancel the deferred location request indicated by the LDR reference number.

At the process 965 of FIG. 10 according to an embodiment, the target UE cancels the original event driven deferred location request. The UE then returns a LCS Event Cancel Invoke Ack. message back to the MSC/SGSN without carrying any event message.

Referring again to FIG. 8B, the process 881 of the method 800B sets for the second network subsystem to receive a cancellation response from the network user after the latter successfully cancels the indicated location request. The second network subsystem further transmits a cancellation service response to the first network subsystem. This process can be illustrated in more detail by the processes 966-967 of FIG. 10. Subsequently, the first network subsystem further sends the cancellation service response to the network client in process 885 of the method 800B. Detail is described in processes 968-969 of FIG. 10.

At the process 966 of FIG. 10 according to an embodiment, the MSC/SGSN sends a second PSL Ack. message to the V-GMLC, including the LDR reference number, the H-GMLC address, and message indicating whether the LCS Cancel Service Request for canceling the event driven location service with the assigned LDR reference number has been successfully canceled or not.

At the processes 967-969 of FIG. 10 according to an embodiment, the V-GMLC, based on received second PSL Ack. message, returns a second LCS Cancel Service Response message to the LCS Client via the H-GMLC and the R-GMLC, including necessary message indicating whether the LCS Cancel Service Request for canceling the event driven location service with the assigned LDR reference number has been successfully canceled.

Alternatively, at Process 865 of the method 800B, if the second network subsystem determines that the second (special) event does not occur under certain conditions preset by the network client or the network system, the network system may perform Process 891 to send a failure message back to the network client. In one embodiment, the preset conditions for determining the occurrence of the second event may comprise a maximum time period. The time period may start from a first time of information associated with the second event being received by the network system and ending at a second time defined by the network client or predetermined by the network system. In one embodiment, the failure message may be returned to the network client in terms of the LCS Service Response message as shown in FIG. 5.

As described above and further emphasized here, FIGS. 4A, 4B, 8A, and 8B are merely examples, which should not unduly limit the scope of the claims. One of ordinary skilled in the art would recognize many variations, alternations, and modifications. According to a specific embodiment of the present invention, a method for a network system to send location service request to a network user includes receiving a location request initiated from a network client, the location request including information associated with a first event and information associated with a second event. The method further includes processing the location request and returning a first receipt acknowledgment of the location request to the network client. Additionally, the method includes determining whether the second event occurs. If the second event is determined to have occurred, the network system sends an event message, which includes information associated with the first event, to the network user. Moreover, the method includes returning a second receipt acknowledgment of the event message to the network client.

According to another embodiment of the present invention, a method for a network system to send a location service cancellation request to a network user includes receiving a cancellation request for canceling a location request with an assigned LDR reference number. The location request includes information associated with a first event. The cancellation request includes information associated with the LDR reference number and a second event. The method further includes processing the cancellation request and returning a receipt acknowledgment of the cancellation request to a network client. Additionally, the method includes determining whether the second event occurs. If the second event is determined to have occurred, the network system sends a cancellation message to instruct the network user to cancel the location request indicated by the LDR reference number. Moreover the method includes sending a cancellation service response to the network client.

According to yet another embodiment of the present invention, a method for a network system to send location service request to a network user includes receiving a location request by a first network subsystem from a network client. The location request includes information associated with a first event and information associated with a second event. The method further includes transferring information associated with the second event to a second network subsystem and returning a first receipt acknowledgment of the location request to the network client. Additionally, the method includes determining by the second network subsystem whether the second event occurs. If the second event is determined to have occurred, the method includes notifying the first network subsystem to send the location request including information associated with the first event to the second network subsystem The method further includes sending an event message by the second network subsystem to the network user. The event message includes information associated with the first event and returning a second receipt acknowledgment to the first network subsystem. Moreover, the method includes sending the second receipt acknowledgment by the first network subsystem to the network client.

According to yet still another embodiment of the present invention, a method for a network system to send a location service cancellation request to a network user includes receiving a cancellation request from a network client by a first network subsystem for canceling a location request with an assigned LDR reference number. The location request includes information associated with a first event. The cancellation request includes information associated with a second event. The method further includes transferring information associated with the second event to a second network subsystem and returning a receipt acknowledgment to a network client. Additionally, the method includes determining by the second network subsystem whether the second event occurs. If the second event is determined to have occurred, the method includes notifying the first network subsystem to send the cancellation request including the LDR reference number assigned for the location request to the second network subsystem. The method further includes sending a cancellation message to instruct the network user to cancel the location request indicated by the LDR reference number and returning a cancellation service response to the first network subsystem. Moreover, the method includes sending the cancellation service response to the network client.

It is also understood that the examples and embodiments described herein are for illustrative purposes only and that various modifications or changes in light thereof will be suggested to persons skilled in the art and are to be included within the spirit and purview of this application and scope of the appended claims.

The invention claimed is:

1. A method for a network system to send location request to a network user, the method comprising:
   receiving a location request from a network client, the location request including information associated with a first event detected by the network user to trigger a location report to the network client and information associated with an identification of the network user capable of being attached by the network system event;
   processing the location request;
   determining whether the network user is capable of being attached by the network system;
   if it is determined that the network user is capable of being attached by the network system, sending an event message to the network user, the event message including information associated with the first event; and
   returning a receipt acknowledgment of the event message to the network client.

2. The method of claim 1 wherein the location request may be a deferred location request.

3. The method of claim 2 wherein the location report from the network user may comprise at least one of a single location information reported once or a current location information periodically triggered by the first event.

4. The method of claim 2 wherein the processing the location request by the network system further comprises:
   sending the location request including a Home Gateway Mobile Location Center address and a reference number associated with the location request to a network node in the network system capable of attaching the network user; and
   determining whether the network node supports identification of the network user capable of being attached by the network system the event detection, if yes, sending a receipt acknowledgment of the location request to the network client; otherwise, sending an error message to the network client.

5. The method of claim 4 wherein the receipt acknowledgement comprises the reference number, and an indication of successful receipt of the location request by the network node, without including the location information of the network user.

6. The method of claim 2 wherein the determining whether the identification of the network user capable of being attached by the network system event occurs further comprises:
   terminating the location request by the network system if the identification of the network user capable of being attached by the network system event has not occurred within a time period; and
   sending a failure message to the network client;
   wherein the time period starts from a first time of information associated with the identification of the network user capable of being attached by the network system event being received by the network system and ends at a second time defined by the network client or predetermined by the network system.

7. The method of claim 2 wherein the sending an event message to the network user comprises sending information at least associated with a Home Gateway Mobile Location Center address, a reference number assigned for the location request, and conditions for the network user to provide location information at the occurrence of the first event.

8. The method of claim 2 wherein the returning a receipt acknowledgment of the event message comprises sending at least the reference number assigned for the location request, and an indication that the network user has successfully received the location request including conditions for the network user to provide location information at the occurrence of the first event.

9. The method of claim 1, further comprises:
   if the network system detects that the network user originally attached to a first network node has changed to attach a second network node, repeating a step of processing the location request based on an user message, the user message including information of the network user being attached by the second network node; and
   sending the event message to the network user from the second network node.

10. A method for a network system to send a location service (LCS) cancellation request to a network user, the method comprising:
    receiving an LCS cancellation request from a network client for canceling a location request, the location request including information associated with a first event detected by the network user to trigger a location report to the network client, the LCS cancellation request including information associated with the reference number and an identification of the network user capable of being attached by the network system event;
    processing the LCS cancellation request;
    determining whether the network user is capable of being attached by the network system;
    if it is determined that the network user is capable of being attached by the network system, sending a cancellation message to instruct the network user to cancel the location request; and
    sending a cancellation service response to the network client.

11. The method of claim 10 wherein the location request to be canceled is a deferred location request received by the network user prior to the LCS cancellation request.

12. The method of claim 11 wherein the LCS cancellation request may be initiated at least by one of the network client or the network system itself.

13. A network system for providing location service about a network user for a network client, the network system comprising:
    a location service (LCS) system configured to:
      receive a location request from a network client, the location request including information associated with a first event detected by the network user to trigger a location report to the network client and information associated with an identification of the network user capable of being attached by the network system event;
      process the location request;
      determine whether the network user is capable of being attached by the network system;
      if it is determined that the network user is capable of being attached by the network system, send an event message to the network user, the event message including information associated with the first event; and
      return a receipt acknowledgment of the event message to the network client.

14. The network system of claim 13 wherein the receipt acknowledgment of the event message comprises at least information that the network user has successfully received the location request including conditions for the network user to provide location information at the occurrence of the first event.

15. The network system of claim 13 wherein the LCS system further comprises at least one of function logic entities of Gateway Mobile Location Center (GMLC), user data storage server (HLR/HSS), Mobile Switch Center (MSC) and/or Serving General-Packet-Radio-System Support Node (SGSN) in Central Network (CN), and Radio Access Network (RAN).

16. The network system of claim 15 wherein the LCS system further comprises a software/hardware entity that interact with the network client and/or the network user.

17. The network system of claim 13 wherein the network client at least resides in the LCS system itself or the network user itself.

18. The network system of claim 13 wherein the network user comprises one or more Mobile Stations including at least one of Mobile or User Equipment (UE) with Subscriber Identity Module (SIM) or Universal Subscriber Identity Module (USIM) capable of being attached with the LCS system.

19. A network system for providing location service about a network user for a network client, the network system comprising:
    a location service (LCS) system configured to:
      receive an LCS cancellation request from a network client for canceling a location request, the location request including information associated with a first event detected by the network user to trigger a location report to the network client, the LCS cancellation request including information associated the reference number and an identification of the network user capable of being attached by the network system event;
      process the LCS cancellation request;
      determine whether the network user is capable of being attached by the network system;

if it is determined that the network user is capable of being attached by the network system, send a cancellation message to instruct the network user to cancel the location request; and send a cancellation service response to the network client.

20. A method for a network system to send location request to a network user, the method comprising:

receiving a location request by a first network subsystem from a network client, the location request including information associated with a first detected by the network user to trigger a location report to the network client event and information associated with an identification of the network user capable of being attached by the network system event;

transferring information associated with the identification of the network user capable of being attached by the network system event to a second network subsystem;

returning a first receipt acknowledgment of the location request to the network client;

determining by the second network subsystem whether the identification of the network user capable of being attached by the network system event occurs;

if the identification of the network user capable of being attached by the network system event is determined to have occurred, receiving the location request including information associated with the first detected by the network user to trigger a location report to the network client event from the first network subsystem;

sending an event message to the network user, the event message including information associated with the first detected by the network user to trigger a location report to the network client event; and returning a second receipt acknowledgment to the first network subsystem; and sending the second receipt acknowledgment by the first network subsystem to the network client.

21. The method of claim 20 wherein the location request may be a deferred location request including information associated with the first detected by the network user to trigger a location report to the network client event detected by the network user to trigger a location report to the network client and information associated with the identification of the network user capable of being attached by the network system event.

22. The method of claim 20 wherein the first receipt acknowledgement comprises a reference number assigned for the location request, an indication of successful receipt of the location request by the first network subsystem, and an indication of successful receipt of information associated with the identification of the network user capable of being attached by the network system event by the second network subsystem, without including the location information of the network user.

23. The method of claim 22 wherein the event message comprises a Home Gateway Mobile Location Center address, the reference number, and conditions for the network user to provide location information at the occurrence of the first event.

24. The method of claim 22 wherein the second receipt acknowledgment comprises the reference number, and an indication that the network user has successfully received the location request including conditions for the network user to provide location information at the occurrence of the user equipment (UE) available event.

25. A method for a network system to send a location service cancellation request to a network user, the method comprising:

receiving a location service (LCS) cancellation request from a network client by a first network subsystem for canceling a location request, the location request including information associated with a first detected by the network user to trigger a location report to the network client event, the LCS cancellation request including information associated with an identification of the network user capable of being attached by the network system event;

transferring information associated with the identification of the network user capable of being attached by the network system event to a second network subsystem;

returning a receipt acknowledgment of the LCS cancellation request to the network client;

determining by the second network subsystem whether the identification of the network user capable of being attached by the network system event occurs;

if the identification of the network user capable of being attached by the network system event is determined to have occurred, receiving the LCS cancellation request from the first network subsystem;

sending a cancellation message by the second network subsystem to instruct the network user to cancel the location request; and returning a cancellation service response to the first network subsystem; and sending the cancellation service response by the first network subsystem to the network client.

26. The method of claim 25 wherein the location request to be canceled is a deferred location request with a reference number received by the network user prior to the LCS cancellation request.

27. A network system for providing location service about a network user for a network client, the network system comprising:

a first network subsystem;

a second network subsystem in communication with the first network subsystem;

wherein, the first network subsystem is configured to:

receive a location request from a network client, the location request including information associated with a first detected by the network user to trigger a location report to the network client event and information associated with an identification of the network user capable of being attached by the network system event, the identification of the network user capable of being attached by the network system event being associated with a network user;

transfer information associated with the identification of the network user capable of being attached by the network system event to the second network subsystem; and return a first receipt acknowledgment of the location request to the network client;

the second network subsystem is configured to:

determine whether the identification of the network user capable of being attached by the network system event occurs;

if the identification of the network user capable of being attached by the network system event is determined to have occurred, receive the location request including information associated with the first event from the first network subsystem;

send an event message to the network user, the event message including information associated with the first event; and return a second receipt acknowledgment of the location request to the first network subsystem;

the first network subsystem is further configured to send the second receipt acknowledgment of the location request to the network client.

28. The network system of claim 27 wherein the second receipt acknowledgment includes at least information that the network user has successfully received the location request including conditions for the network user to provide location information at the occurrence of the first event.

29. The network system of claim 27 wherein the first network subsystem comprises a network logic entity including at least a Home Gateway Mobile Location Center.

30. The network system of claim 27 wherein the second network subsystem comprises one or more network logic entities including at least a Mobile Switch Center (MSC) and/or a Serving General-Packet-Radio-System Support Node (SGSN) in central network.

31. A network system for providing location service about a network user for a network client, the network system comprising:

a first network subsystem;

a second network subsystem in communication with the first network system;

wherein, the first network subsystem is configured to:

receive a location service (LCS) cancellation request from a network client for canceling a location request, the location request including information associated with a first detected by the network user to trigger a location report to the network client event, the LCS cancellation request including information associated with an identification of the network user capable of being attached by the network system event, the identification of the network user capable of being attached by the network system event being associated with a network user;

transfer information associated with the identification of the network user capable of being attached by the network system event to a second network subsystem; and return a receipt acknowledgment to the network client;

the second network subsystem is configured to:

determine whether the identification of the network user capable of being attached by the network system event occurs;

if the identification of the network user capable of being attached by the network system event is determined to have occurred, receive the LCS cancellation request from the first network subsystem;

send a cancellation message to instruct the network user to cancel the location request; and return a cancellation service response to the first network subsystem;

the first network subsystem is further configured to send the cancellation service response to the network client.

32. The network system of claim 31 wherein the receipt acknowledgment includes at least an indication that the LCS cancellation request including information associated with the identification of the network user capable of being attached by the network system event is received by the second network subsystem and the cancellation service response includes at least a message that the location request is successfully canceled by the network user.

* * * * *

UNITED STATES PATENT AND TRADEMARK OFFICE
CERTIFICATE OF CORRECTION

PATENT NO. : 8,577,990 B2  
APPLICATION NO. : 11/874192  
DATED : November 5, 2013  
INVENTOR(S) : Zhengkai Ge Page 1 of 1

It is certified that error appears in the above-identified patent and that said Letters Patent is hereby corrected as shown below:

In the Claims

Claim 9, Column 33/Line 41 should read: "cessing the location request based on a user message,"

Claim 16, Column 34/Line 41 should read: "interacts with the network client and/or the network user."

Claim 19, Column 34/Line 59 should read: "including information associated with the reference number"

Claim 20, Column 35/Line 10 should read: "information associated with a first event detected by the net-"

Claim 20, Column 35/Line 33 should read: "to the network client event;"

Claim 21, Column 35/Line 40 should read: "associated with the first event detected by the network user to trig-"

Claim 25, Column 36/Line 7 should read: "ing information associated with a first event detected by the"

Claim 25, Column 36/Line 28 should read: "location request;"

Claim 27, Column 36/Line 46 should read: "tion request including information associated with a first event"

Claim 31, Column 38/Line 1 should read: "first event detected by the network user to trigger a location"

Signed and Sealed this  
Sixth Day of May, 2014

Michelle K. Lee  
*Deputy Director of the United States Patent and Trademark Office*